United States Patent [19]

Sanik et al.

[11] Patent Number: 4,819,149
[45] Date of Patent: Apr. 4, 1989

[54] DISTRIBUTED CONTROL SYSTEM

[75] Inventors: Paul S. Sanik; Dennis H. Shreve, both of Westerville; Eugene C. Varrasso, Heath, all of Ohio

[73] Assignee: Owens-Corning Fiberglas Corporation, Toledo, Ohio

[21] Appl. No.: 859,151

[22] Filed: May 2, 1986

[51] Int. Cl.⁴ .................. G06F 15/46; G06F 15/16
[52] U.S. Cl. .......................... 364/132; 364/200
[58] Field of Search ................. 364/131-136, 364/138, 139, 200 MS File

[56] References Cited

U.S. PATENT DOCUMENTS

| | | | |
|---|---|---|---|
| 3,962,685 | 6/1976 | Isle | 340/172.5 |
| 4,064,394 | 12/1977 | Allen | 364/107 |
| 4,123,794 | 10/1978 | Matsumoto | 364/101 |
| 4,124,889 | 11/1978 | Kaufman et al. | 364/200 |
| 4,177,514 | 12/1979 | Rupp | 364/200 |
| 4,251,858 | 2/1981 | Cambigue et al. | 364/200 X |
| 4,253,148 | 2/1981 | Johnson et al. | 364/200 |
| 4,281,379 | 7/1981 | Austin | 364/132 |
| 4,283,773 | 8/1981 | Daughton et al. | 364/900 |
| 4,347,564 | 8/1982 | Sugano et al. | 364/132 |
| 4,472,783 | 9/1984 | Johnstone et al. | 364/132 X |
| 4,514,814 | 4/1985 | Evans | 364/132 X |
| 4,542,479 | 9/1985 | Kamimura et al. | 364/900 |
| 4,641,269 | 2/1987 | Japenga et al. | 364/131 X |

Primary Examiner—Joseph Ruggiero
Attorney, Agent, or Firm—Patrick P. Pacella; Debra L Pawl

[57] ABSTRACT

A hierarchical distributive control system is disclosed. The lowest level of the system is a stand alone controller with hot plug in capability, which can accept either analog or digital signals, scale these signal with input subroutines, perform any one of a number of algorithms to produce control signals or can manually produce control signals and output these control signals as either analog or digital signals to field devices. A plurality of controllers communicates with an associated condenser over duel parallel digital communication buses with a full echo, verify communication routine. The condenser contains all records for all controllers under its supervision and can download control information into any replaced controller. A subhost is interconnected to a group of condensers and contains all records contained in all condensers under its supervision. All information can be uploaded from condensers to subhost or downloaded from subhost to condenser. In case of any failure in any subsystem, all lower level systems continue to operate. All controllers are interchangeable.

28 Claims, 13 Drawing Sheets

COMPLETE CONTROLLER BACK PLANE DESCRIPTION  SIDE 1

| PIN N° | SIGNAL | DESCRIPTION |
|---|---|---|
| A | 10 VAC | 10 VOLTS - AC |
| B | 10 VAC RET | 10 VOLTS AC, RETURN LINE |
| C | 24 V GND. | GROUND FOR 24 VDC |
| D | +24 V | +24 VOLTS DC |
| E | +15 V | +15 VOLTS DC |
| F | ±15 V GND. | GROUND FOR + AND -15 VOLTS DC |
| H | -15 V | NEGATIVE 15 VOLTS DC |
| J | +5 V | +5 VOLTS DC |
| K | 5 V GND. | GROUND FOR 5 VOLTS DC |
| L | ID 2 | IDENTIFICATION LINE VALUE: 2 |
| M | ID 8 | IDENTIFICATION LINE VALUE: 8 |
| N | READ REQ. | READ REQUEST LINE |
| P | WRITE ACK | WRITE ACKNOWLEDGE LINE |
| R | CO 7 | DIGITAL PARALLEL COMMUNICATION OUTPUT BIT 7 |
| S | CO 5 | DIGITAL PARALLEL COMMUNICATION OUTPUT BIT 5 |
| T | CO 3 | DIGITAL PARALLEL COMMUNICATION OUTPUT BIT 3 |
| U | CO 1 | DIGITAL PARALLEL COMMUNICATION OUTPUT BIT 1 |
| V | CI 7 | DIGITAL PARALLEL COMMUNICATION INPUT BIT 7 |
| W | CI 5 | DIGITAL PARALLEL COMMUNICATION INPUT BIT 5 |
| X | CI 3 | DIGITAL PARALLEL COMMUNICATION INPUT BIT 3 |
| Y | CI 1 | DIGITAL PARALLEL COMMUNICATION INPUT BIT 1 |
| Z | DO 0 | DIGITAL DATA OUTPUT BIT 0 |
| $\overline{A}$ | DO 1 | DIGITAL DATA OUTPUT BIT 1 |
| $\overline{B}$ | DO 2 | DIGITAL DATA OUTPUT BIT 2 |
| $\overline{C}$ | DO 3 | DIGITAL DATA OUTPUT BIT 3 |
| $\overline{D}$ | DO 4 | DIGITAL DATA OUTPUT BIT 4 |
| $\overline{E}$ | DO 5 | DIGITAL DATA OUTPUT BIT 5 |
| $\overline{F}$ | DO 6 | DIGITAL DATA OUTPUT BIT 6 |
| $\overline{H}$ | DO 7 | DIGITAL DATA OUTPUT BIT 7 |
| $\overline{J}$ | SPARE | UNUSED |
| $\overline{K}$ | SPARE | UNUSED |
| $\overline{L}$ | ATN | ATTENTION LINE |
| $\overline{M}$ | SPARE | UNUSED |
| $\overline{N}$ | A IN | ANALOG INPUT SIGNAL |
| $\overline{P}$ | FAIL | CONTROLLER FAIL SIGNAL |
| $\overline{R}$ | A OUT | ANALOG OUTPUT SIGNAL |

FIG.3

COMPLETE CONTROLLER BACK PLANE DESCRIPTION SIDE 2

| PIN N° | SIGNAL | DESCRIPTION |
|---|---|---|
| 1 | 10 VAC | 10 VOLTS - AC |
| 2 | 10 VAC RET | 10 VOLTS - AC RETURN LINE |
| 3 | 24 V GND. | GROUND FOR 24 VOLTS DC |
| 4 | +24 V. | +24 VOLTS DC |
| 5 | +15 V | +15 VOLTS DC |
| 6 | ±15V GND. | GROUND FOR + AND -15 VOLTS DC |
| 7 | -15 V | NEGATIVE 15 VOLTS DC |
| 8 | +5 V | +5 VOLTS DC |
| 9 | 5V GND | GROUND FOR 5 VOLTS DC |
| 10 | ID 1 | IDENTIFICATION LINE VALUE = 1 |
| 11 | ID 4 | IDENTIFICATION LINE VALUE = 4 |
| 12 | READ ACK | READ ACKNOWLEDGE LINE |
| 13 | WRITE STB | WRITE STROBE LINE |
| 14 | CO 6 | DIGITAL PARALLEL COMMUNICATION OUTPUT BIT 6 |
| 15 | CO 4 | DIGITAL PARALLEL COMMUNICATION OUTPUT BIT 4 |
| 16 | CO 2 | DIGITAL PARALLEL COMMUNICATION OUTPUT BIT 2 |
| 17 | CO 0 | DIGITAL PARALLEL COMMUNICATION OUTPUT BIT 0 |
| 18 | CI 6 | DIGITAL PARALLEL COMMUNICATION INPUT BIT 6 |
| 19 | CI 4 | DIGITAL PARALLEL COMMUNICATION INPUT BIT 4 |
| 20 | CI 2 | DIGITAL PARALLEL COMMUNICATION INPUT BIT 2 |
| 21 | CI 0 | DIGITAL PARALLEL COMMUNICATION INPUT BIT 0 |
| 22 | DI 0 | DIGITAL PARALLEL DATA INPUT BIT 0 |
| 23 | DI 1 | DIGITAL PARALLEL DATA INPUT BIT 1 |
| 24 | DI 2 | DIGITAL PARALLEL DATA INPUT BIT 2 |
| 25 | DI 3 | DIGITAL PARALLEL DATA INPUT BIT 3 |
| 26 | DI 4 | DIGITAL PARALLEL DATA INPUT BIT 4 |
| 27 | DI 5 | DIGITAL PARALLEL DATA INPUT BIT 5 |
| 28 | DI 6 | DIGITAL PARALLEL DATA INPUT BIT 6 |
| 29 | DI 7 | DIGITAL PARALLEL DATA INPUT BIT 7 |
| 30 | SPARE | UNUSED |
| 31 | SPARE | UNUSED |
| 32 | SPARE | UNUSED |
| 33 | SPARE | UNUSED |
| 34 | A IN GND. | ANALOG INPUT GROUND |
| 35 | AUTO | AUTOMATIC MODE |
| 36 | A OUT GND. | ANALOG OUTPUT GROUND |

FIG. 3A

CONDENSER MEMORY MAP

| MEMORY LOCATION | DESCRIPTION |
|---|---|
| $FFFF - $F000 | READ ONLY MEMORY (EPROM) |
| $EFFF - $EC00 | INPUT/OUTPUT DEVICES |
| $EBFF - $E000 | VIDEO RANDOM ACCESS MEMORY |
| $DFFF - $C000 | RANDOM ACCESS MEMORY |
| $BFFF - $4000 | RANDOM ACCESS MEMORY |
| $3FFF - $0000 | RANDOM ACCESS MEMORY |

SPECIFIC MEMORY LOCATIONS FOR INPUT/OUTPUT DEVICES
(ADDRESSES $EFFF - $EC00)

| MEMORY LOCATION | DESCRIPTION |
|---|---|
| $ECFF - $ECF0 | SERIAL COMMUNICATION CONTROLLER |
| $ECFF - $ECF0 | PIA FOR VIDEO DISPLAY AND SDCC ADDRESS |
| $EC8F - $EC8E | DIGITAL MULTIPLEXER INPUT/OUTPUT |
| $EC8D - $EC8C | ANALOG INPUT/OUTPUT |
| $EC8B - $EC88 | PIA FOR ATTN STRB AND WATCHDOG TIMER |
| $EC87 - $EC84 | PIA FOR KEYBOARD |
| $EC83 - $EC80 | PIA FOR PARALLEL INPUT/OUTPUT COMMUNICATION |
| $EC7F - $EC78 | BUBBLE MEMORY CONTROLLER |
| $EC77 - $EC60 | DIRECT MEMORY ACCESS CONTROLLER |
| $EC5D - $EC58 | ARITHMETIC PROCESSING UNIT |
| $EC53 - $EC52 | SERIAL INPUT/OUTPUT UNIT #2 |
| $EC51 - $EC50 | SERIAL INPUT/OUTPUT UNIT #1 |

FIG. 10

DISTRIBUTED CONTROL SYSTEM

TECHNICAL FIELD

This invention relates to a process control system and more particularly to microprocessor based distributed control system using identical controllers having hot plug in capability with hierarchical control and stand alone capability in case of failure of any higher level control used for controlling industrial processes.

BACKGROUND OF THE INVENTION

With the development of commercially available digital computers industrial process control has been typically handled through centralized direct digital control systems. These systems included a main frame computer which is programmed to control processes. From time to time, the program would be modified to change the control of processes and to accept new process control functions or parameters. As a result, the use of computerized direct digital control of processes was expanded in order to control more of the total process than could previously been achieved with prior conventional analog process controllers. However, a number of major fundamental problems existed with such a main frame, direct digital control system. As with any complex piece of equipment, maintenance was difficult and required personnel with specialized training. As the process control became more sophisticated, it became impractical to maintain in-house service personnel for the computerized system. Therefore, users had to rely upon vendors for maintenance and repair support. Moreover, in a continuous process, the failure of the central computer could have catastrophic effects because control of a substantial portion if not all of the overall process would be interrupted. In some areas of technology, such as glass forming, reliance upon a single main frame central processing control system became impractical because of the potential of these catastrophic failures.

More recently, distributed computer control systems have been developed in which a single board computer is connected to each control device with each single board computer having a specific program dedicated to the particular control device. However, a number of drawbacks have been associated with the distributed computer control systems. In order to conserve memory and reduce operational time, the single board computers are generally programmed in a low-level, assembly-type language. As a result, many system users are reluctant to employ distributed single board computers because of the difficulty of obtaining or training personnel to program the computers. Moreover, because maintenance personnel are typically not trained in programming, a large inventory of single board computers are necessary in order to properly repair a system malfunction by replacing the microprocessor which is down. In addition, should there be a desire to upgrade or modify the program in any given microprocessor, such modification or upgrading will often require the modification of the overall system control program. Thus, cost effective retrofitting of existing industrial process control systems is not feasible.

Johnson et al. disclosed in U.S. Pat. No. 4,253,148 a system of distributed control of a process which was designed to overcome the difficulty of having a large inventory of preprogrammed microprocessors for each device to be controlled. Thus, in the Johnson et al. system a master or composite program was developed which was capable of controlling all possible logic functions and command sequences for all of the devices to be controlled. This program was downloaded into each of a plurality of microprocessors. Because each microprocessor was designed to control a specific device, a user alterable interconnection device was provided in each microprocessor in the form of a programmable read only memory (PROM). The PROM in each microprocessor allowed only those portions of the master program which related to the logic control functions and control sequences of a particular control device to be connected to the input/output ports associated with the device. Thus, as each microprocessor continuously looped through the master program, only those program steps which related to the control functions and sequences for a control device would be operative. This system had the drawback that a sometimes massive program had to be downloaded into each microprocessor. In addition, the time constraints on such a system which must loop through the entire master program is such that some processes cannot be adequately controlled. Moreover, because the master control program is stored in each microprocessor, storage space for other data such as process control data and operational parameters is limited.

It, therefore, is an object of the present invention to provide an improved distributive control, microprocessor based process control system, with interchangeable components whose programming is transparent to the operators.

DISCLOSURE OF THE INVENTION

Accordingly, the present invention is directed to a multiple level distributed process control system. The system includes a plurality of identical controllers each having analog data input, analog data output, digital data input, and digital data output circuitry. Further, the controllers include identification or ID lines, an attention line, two eight bit parallel communication buses, a control bus and power lines. All interconnections including power are on a single printed circuit connector on the rear of the controller allowing plug in capability. All ground pin interconnections are longer than all remaining connector pins allowing hot plug in of controllers without the necessity of removing power from the system to replace controllers. The controllers have two visual displays on the front face to be able to monitor both the process target setting and the current value of the process variable. Indicator lamps are provided to signal the status of the controller. Switches and a potentiometer are provided on the face of the controller to allow each controller to be adjusted manually allowing full stand alone capability. Internally, each controller has a microprocessor, interface circuitry, random access memory (RAM), and erasable programmable read only memory (EPROM). Within the memory of the controller resides loop records, communication subroutine software, input subroutine software, output subroutine software and algorithm software.

Each of a predetermined number of controllers can be grouped and selectively connected to a condenser system. The condenser system is connected to each of the controllers by two parallel eight bit communication buses. The condenser system includes conventional random access memory (RAM) and erasable programmable read only memory (EPROM) as well as bubble memory. The bubble memory insures the integrity of the programming and data base for each of the controllers should there be a power outage for longer than a predetermined period of time. The EPROM provides a boot program for initialization once power is restored. The condenser initiates communication with the controllers and selectively receives process control data from each of the controllers upon request. This information can be supplied to a supervisory computer system or subhost. The condenser also can receive process control parameters, changes in parameters and programming from the subhost for any controller for which it is associated. As part of the condenser system, there is a keyboard as well as a video display. The keyboard permits entry of control parameters for any one of the controllers connected to the condenser. Accordingly, it is possible to manually vary the temperature, time duration or some other process control by selecting through the keyboard the appropriate controller and then entering the appropriate new parameter. The keyboard can also control the video display and allow the status of any process or the variables of a number of process control loops to be displayed. The controllers and the associated condenser are located relatively close to the devices being controlled.

Communication between the condenser and its associated controllers is initiated and controlled by a unique combination of hardware, firmware and software. The controller cannot initiate communication. The condenser can initiate communication with the controller. The subhost or supervisory computer can initiate communication with the condenser or with the controller through the condenser. The identification or ID of the controller is hardwired into the backplane of the rack interconnecting the controller. One of a possible sixteen attention lines is also hardwired into the backplane of the controller. The condenser initiates communication by activating one of the attention lines. All controllers in the row which are hardwired to the activated attention line are initialized to accept communication. There are two eight bit communication buses hardwired to the condenser and all controllers associated with that condenser. One communication bus is an input bus which inputs information to the controller. The second communication bus is an output bus which receives information from the controller and transfers it to the condenser. Once the condenser has activated the attention line, it places an eight bit signal on the input communication bus. All controllers which have been initialized for communication read this eight bit signal. The eight bit signal includes the controller ID and the number of the activated attention line corresponding to the particular controller with which the condenser wishes to communicate. Only the controller which matches the ID remains in communication mode. All other controllers discontinue the communication routine and resume normal processing. The controller whose ID matches places the received signal on the output communication bus. The condenser reads this signal and if it matches what was sent, then sends the one's compliment of the signal on the input communication bus. The controller then reads this signal and if it is the one's compliment of its ID, it sends the signal back to the condenser on the output communication bus. The condenser again checks to see that this signal is the signal which was sent. This full echo with verify initialization routine checks all sixteen communication lines to verify that they are functioning properly.

Once communication has been initialized, a unique protocol is used to transfer information between the condenser and controller. The condenser always sends a byte which indicates the number of bytes to follow, a byte which is a code for the function which the condenser wishes performed, a number of bytes of information and finally a check sum. The check sum is the one's compliment of the number of bytes sent. The controller in contrast will always send a byte indicating the number of bytes to follow, a number of bytes of information and finally a check sum which is the one's compliment of the number of bytes sent. This check sum feature not only verifies that the proper amount of data was sent, but also verifies that all sixteen communication lines are functioning.

Communication between subhosts and condensers is via a daisy chained serial communication line. The subhost is the master for communication. The condenser cannot initiate communication with the subhost. Communication is by means of a standard synchronous protocol, SDLC. The SDLC protocol specifies the method to direct a message or data to the proper device, to detect the end of the message and to ensure that a message has been successfully transferred. The messages or data are sent in packets and the packet is defined by the first byte of information sent after the protocol has initialized communication. The first byte contains a function code which defines the type of communication and the number of bytes of information to be sent or received. Identical loop records reside in the condenser and the subhost. During communication, information is transferred between loop records in the subhost and the condenser as defined by the function codes. In this manner, the loop records resident in the subhost are periodically updated with information resident in the loop records of the condenser. Similarly, control requirements in the loop records of the condenser may be changed, modified or updated by the subhost.

BRIEF DESCRIPTION OF THE DRAWINGS

FIG. 3 is a description of side 1 of a controller back plane pin out.

FIG. 3A is a description of side 2 of a controller back plane pin out.

FIG. 10 is a memory map of the condenser.

BEST MODE OF CARRYING OUT THE INVENTION

Hardware - Controller

Figure 1:
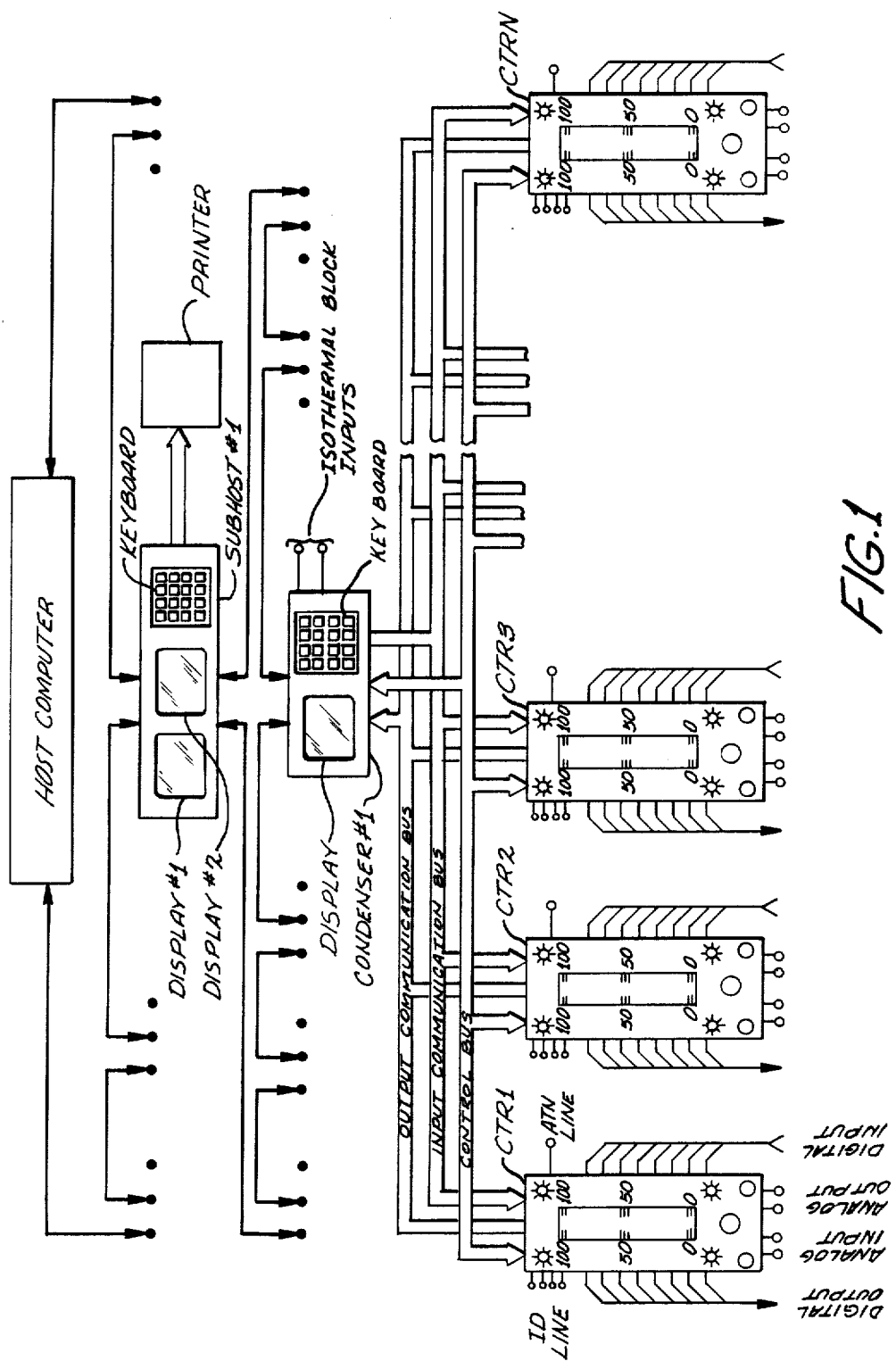
FIG. 1 is a drawing showing the hierarchical interconnections of the various components of the distributed control system.

FIG. 1 is a diagram showing the hierarchical interconnections between the various components of a distributive control system. A plurality of controllers CTR1 through CTRN are interconnected to a condenser unit through an eight bit output communication bus, an eight bit input communication bus and a control bus. The controllers are connected to field devices with either eight bit digital input and output buses or two wire analog input and output lines or both simultaneously. The controllers are also identified by four identification or ID lines and an attention or ATN line. Each controller has two bar type displays for visual representation of process parameters and set point information. Status indicator lamps are provided for rapid determination of the status of the controllers. Switches and a potentiometer are provided for manual control as will be explained later. Each condenser has a video display and keyboard associated with it for inputting information and displaying information. The condenser has analog inputs available for receiving field information relevant to a multitude of controllers such as temperature readings from isothermal blocks. Isothermal blocks are devices which hold a plurality of thermocouple reference junctions at the same temperature. The temperature can be measured and the thermocouple reading corrected without the necessity of providing an ice junction for each thermocouple. The construction of an isothermal block is described in U.S. Pat. No. 4,483,632 to Dewey et al. while the use of such a block is described in U.S. Pat. No. 4,482,261 to Dewey et al. Each condenser communicates with a subhost or supervisory computer by means of a daisy chained serial communication line. The subhost is housed in a process operator's console which includes a printer, a keyboard and two video displays. Each of a plurality of subhosts can communicate to a host or mainframe computer by means of a similar daisy chained serial communication line. Each of the higher level computers can initiate communication with any of the lower level computers. Thus, the host computer can initiate communication with any of the subhosts, with a condenser associated with a particular subhost or with a controller associated with a particular condenser. In case of failure with any component, all lower level components continue to control.

Figure 2:
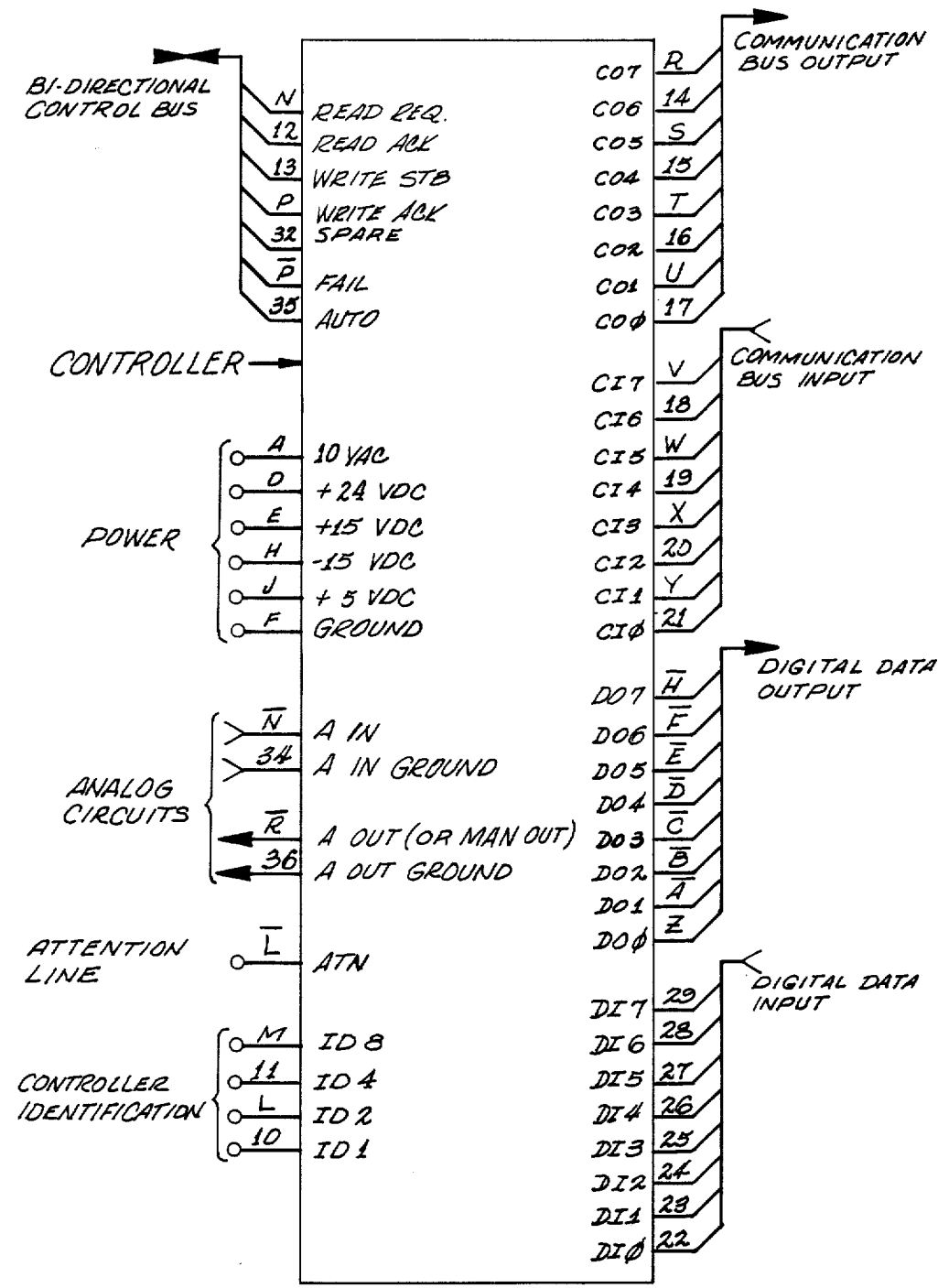
FIG. 2 is a representation of the connections to a typical controller.

FIG. 2 indicates all of the external identification, signal, control and power lines associated with each controller. There is an eight bit output communication bus on line CO0 through CO7. An eight bit input communication bus is on line CI0 through CI7. An eight bit digital data output bus DO0 through DO7 is provided, as is an eight bit digital data input bus DI0 through DI7. Four identification lines numbered ID1, ID2, ID4 and ID8, denoting their binary values, are provided. An attention line ATN is provided as well as will be explained below. A two wire analog input denoted A-in and A-in ground is provided for analog information input. Similarly, a two wire analog output circuit labeled A-out and A-out ground is provided. Various power lines are provided to power the controller. A bidirectional control bus is provided for signals such as READ REQ, READ ACK, WRITE STB and WRITE ACK which are required for communication. In addition, status functions, such as, FAIL and AUTO are provided.

All interconnections to the controller are provided by a dual sided printed circuit board connector on the rear of the controller. Each side of the connector has thirty-six pads. FIG. 3 shows the complete pin out for one side of the connector, while FIG. 3A shows the complete pin out for the opposite side. This interconnection arrangement allows rapid plug-in of the controller into a back plane which has a mating female connector. All ground pins such as positions C, F, D, 3, 6 and 9 are longer than all remaining pins. This allows the controller to be plugged in to the back plane without removing power from the system. This is known as a "hot plug in" and allows controllers to be interchanged without the necessity of stopping control by removing power. A controller, when loaded into a particular position, will be given its control parameters by the condenser and will continue to control in the same manner as the controller it replaced as will be explained below.

Figure 4:
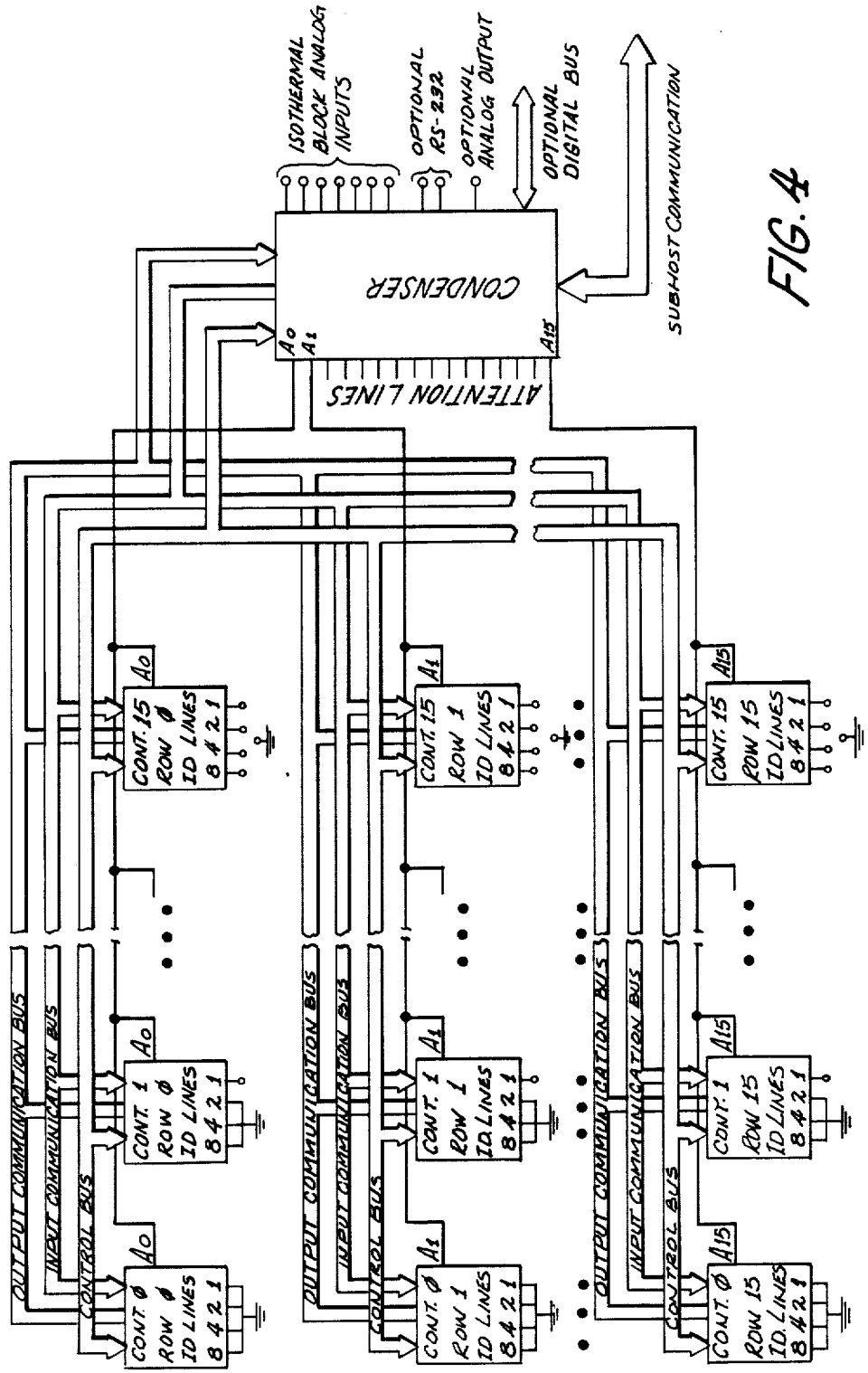
FIG. 4 is a drawing of the interconnection between a condenser and its associated controllers including controller identification lines.

The ability of any controller to replace any other controller lies in the unique hardwired logic in the back plane which identifies every controller position. Referring to FIG. 4, it will be noted that each condenser has sixteen attention lines labeled A0 through A15 associated with it. Each attention line is hardwired to a row of controllers. There can be, therefore, sixteen rows of controllers from row 0 through row 15. Each controller, as previously mentioned, has four ID lines numbered 1, 2, 4 and 8. The back plane selectively grounds these ID lines to identify the controller within a row by binary logic. The number of controllers within a given row can therefore be sixteen, numbered 0 through 15. Since the attention line and the ID is hardwired into the back plane, the position for a given controller identification is always the same. The controller has no identification until it is plugged into the back plane. As an example, controller 14 in row 3 would be wired to attention line A3 and would have ID line 1 grounded. Thus, the ID would be 8+4+2 or 14. The total number of controllers which could be connected to a given condenser would be 16 times 16 or 256 controllers. In actual practice, the controllers and condenser are housed in standard equipment racks. Nine controllers can fit in one row of the rack. This gives a total of 144 controllers that maybe connected to each condenser.

Figure 5:
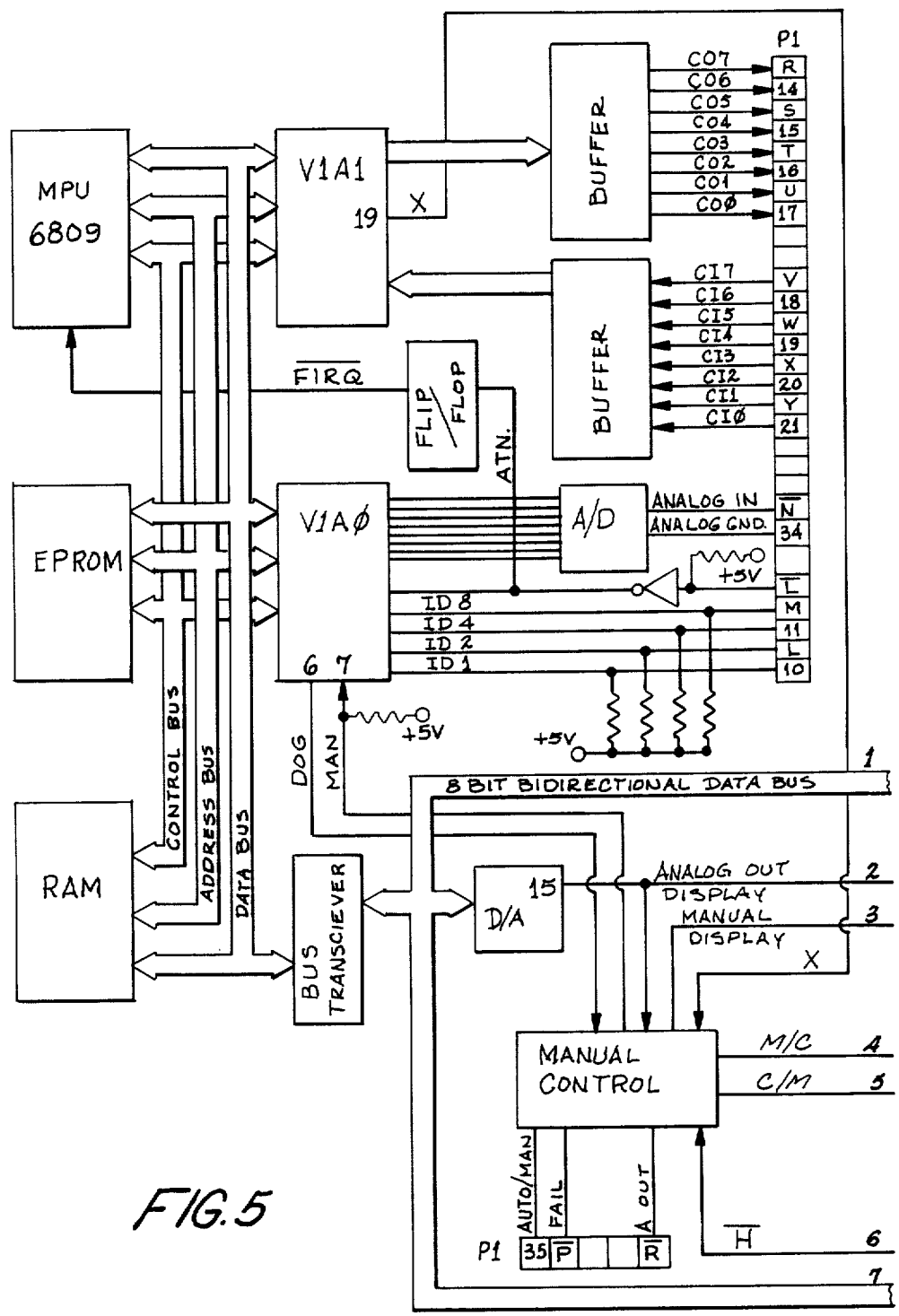
FIG. 5 is a schematic of a portion of a controller.
Figure 5A:
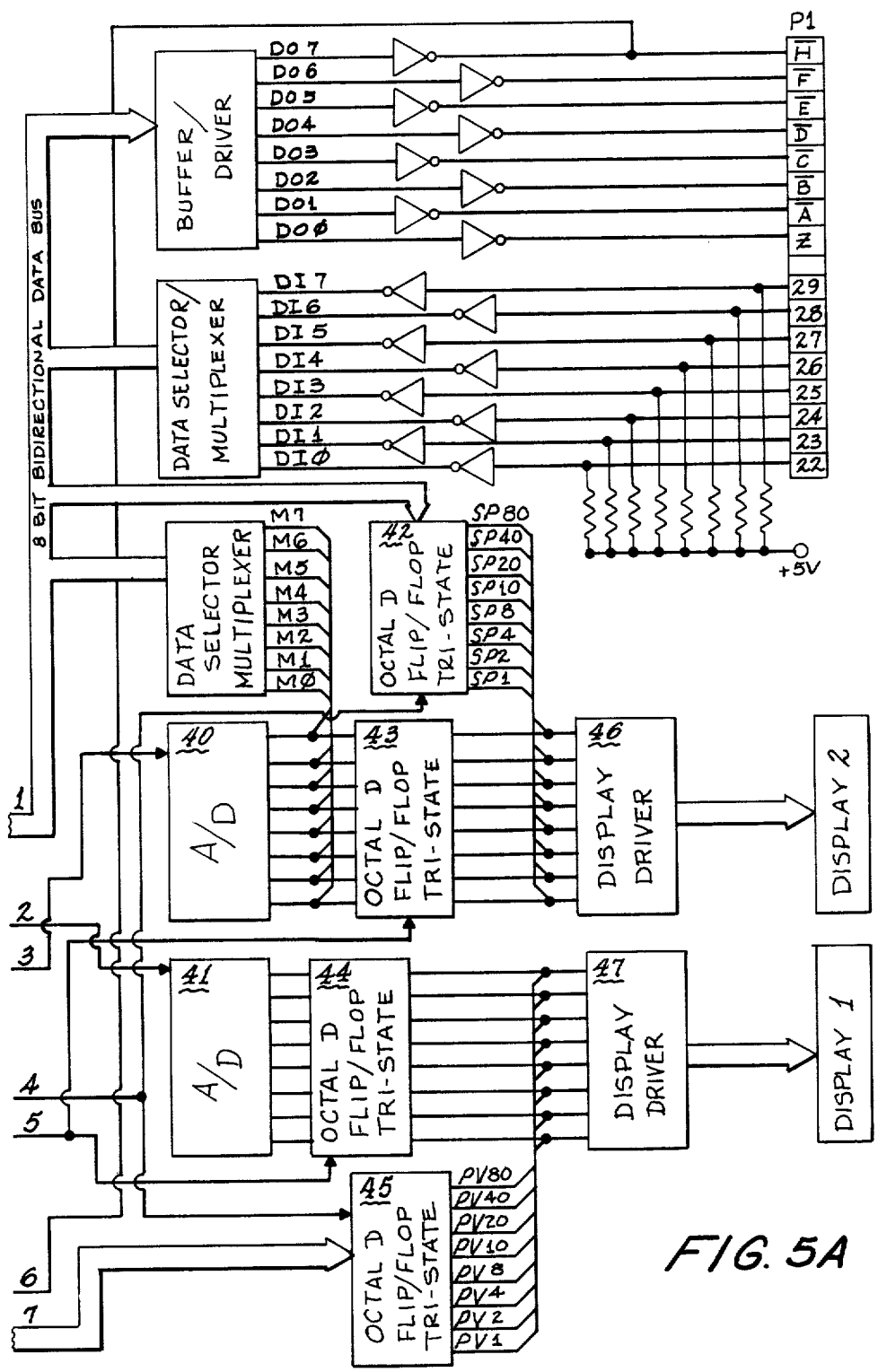
FIG. 5A is a schematic continuation of the controller.

FIGS. 5 and 5A show the internal structure of the controller. The heart of the controller is a microprocessor processing unit, MPU, which can be a Motorola MC6809P microprocessor. The microprocessor is connected by control, address and data buses to erasable programmable read only memory, EPROM, and random access memory, RAM. Inside the EPROM resides boot programs, communication programs, algorithms and input subroutines. The RAM allows memory space for loop records and internal calculations.

Two versatile interface adapters VIA0 and VIA1 are also connected to the internal microprocessor buses. These units are programmable devices such as MCS6522P devices manufactured by Rockwell. The purpose of these devices is to interconnect the two communication buses to the microprocessor buses and to provide a conduit for an input analog signal and controller identification. Communication is straight forward in that the eight input communication lines CI0 through CI7 constituting the input communication bus is fed through a buffer to VIA1. Similarly, VIA1 is interconnected through a buffer to the eight output communication lines CO0 through CO7 which constitutes the output communication bus. P1 is the printed circuit connector on the rear of the unit and the pin designations are the same as shown in FIGS. 3 and 3A. An analog field signal comes into PIN $\overline{N}$ of connector P1 where it is fed to an analog to digital converter A/D. The A/D converter transmits an eight bit digital signal to VIA0. VIA0 is also connected to ID lines ID1, ID2, ID4 and ID8. Since the method of identification is by grounding these lines at the back plane, pull-up resistors connected to a positive five volts ensures that the signal will be high unless grounded. Similarly, the attention line ATN is grounded when activated so a pull-up resistor is used on the line to ensure high signal unless grounded. The attention signal then goes through an inverter to a flip/flop to the fast interrupt FIRQ pin of the microprocessor. In this manner, when the attention line is activated, the microprocessor stops control and immediately goes into the communication subroutine. A signal X goes from VIA1 to the manual control of the controller. Similarly, a signal DOG goes from VIA0 to the manual control, and a signal MAN goes from the manual control to VIA0. The purpose of lines X, DOG and MAN will be explained below.

The internal microprocessor buses are also connected to a bus transceiver. This bus transceiver connects to an eight bit bidirectional data bus. The purpose is isolation and to provide sufficient power to drive the devices connection to the bidirectional data bus. Three major circuits are connected to the bidirectional data bus. They are the analog output, digital data circuitry, including input and output data lines, and the display circuitry. In case of a digital output from the controller to a field device, the digital data are transmitted on the bidirectional data bus through a buffered driver to the individual data output lines DO0 through DO7. The signals on each data line are fed through inverters so that valid signals impressed on the pins of connector P1 will have a low potential. A signal line $\overline{H}$ goes from data line DO7 to the manual control section. This line is used to blink an indicator lamp when the controller is in computer or "soft" manual control as will be explained below. Digital input data from field devices are fed to pins 22 through 29 of connector P1. A valid field signal is a signal in which the field device grounds a pin, i.e., a low potential. Pull-up resistors, connected to a five volt power supply ensures that the data lines are at a high potential unless a valid input signal is indicated. The signals then pass through inverters to a data selector/multiplexer which conditions the signal and passes it onto the bidirectional data bus. The bidirectional data bus is also connected to a digital to analog converter which takes the digital representation of the analog output signal from the microprocessor, converts it to an analog signal and sends this analog signal to the manual control device and to the display. The information outputted to the two display devices is selectable by a switch on the front of the controller as will be explained below. Display 1 can represent the process variable (PV) or can represent the analog output (output). Display 2 can represent the computer generated set point (SP) or the setting of a manual potentiometer (MAN).

Figure 6:
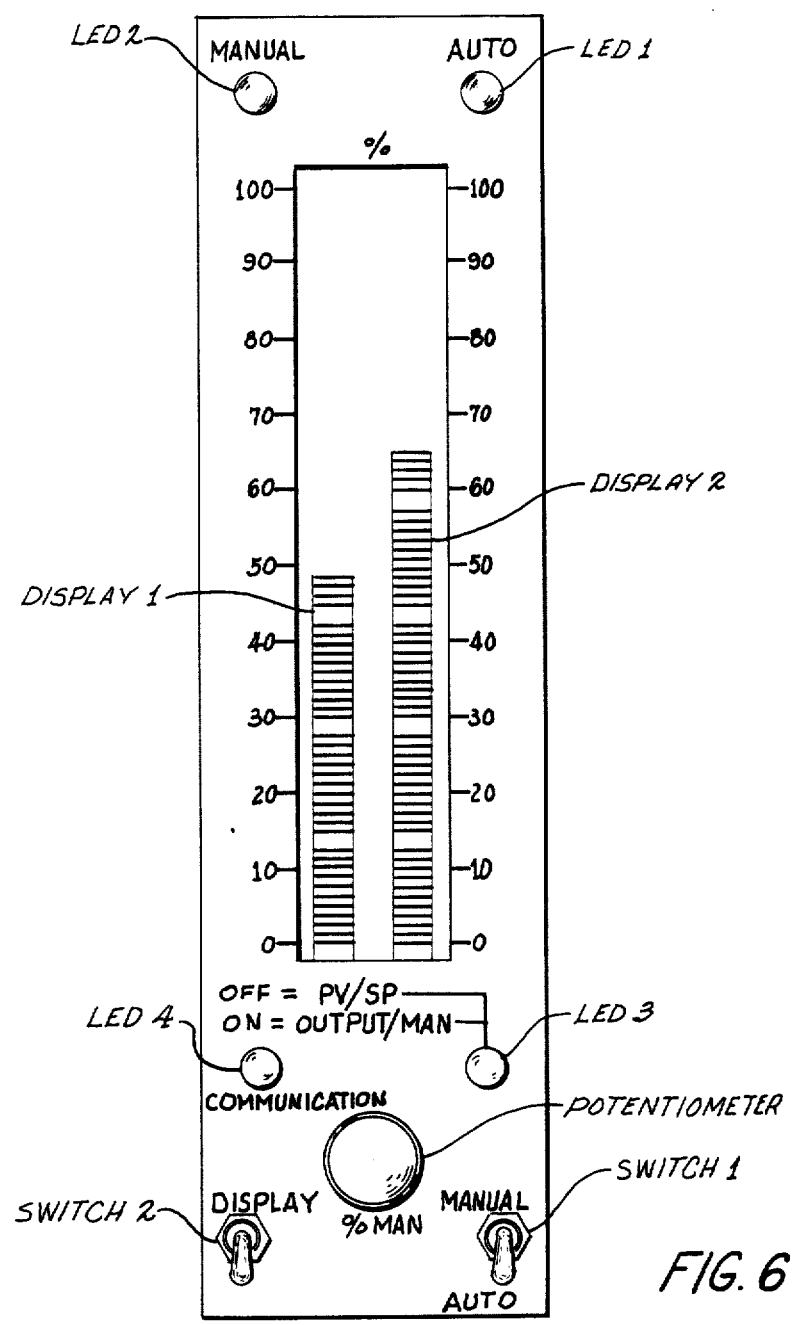
FIG. 6 is an illustration of the front face of the controller.

Referring to FIG. 6, the face of the controller has two displays, Display 1 and Display 2 with scales labeled in percentages. A light emitting diode LED 1 is lit when the controller is in automatic mode. Light emitting diode LED 2 is lit when the controller is in manual mode. A third light emitting diode LED 3 indicates what values are being displayed in the display units. When LED 3 is off, Display 1 is the process variable and Display 2 is the set point. When LED 3 is lit, Display 1 is the output of the controller while Display 2 is the setting of the potentiometer. A fourth light emitting diode LED 4 is lit when the controller is communicating with the condenser. Switch 1 is a two position toggle switch which sets the controller for either automatic operation or for "hard" manual operation. Switch 2 is a momentary contact switch which when activated puts the output of the controller on Display 1 and the manual setting of the potentiometer on Display 2. A potentiometer is provided for manually setting the controller.

Figure 7:
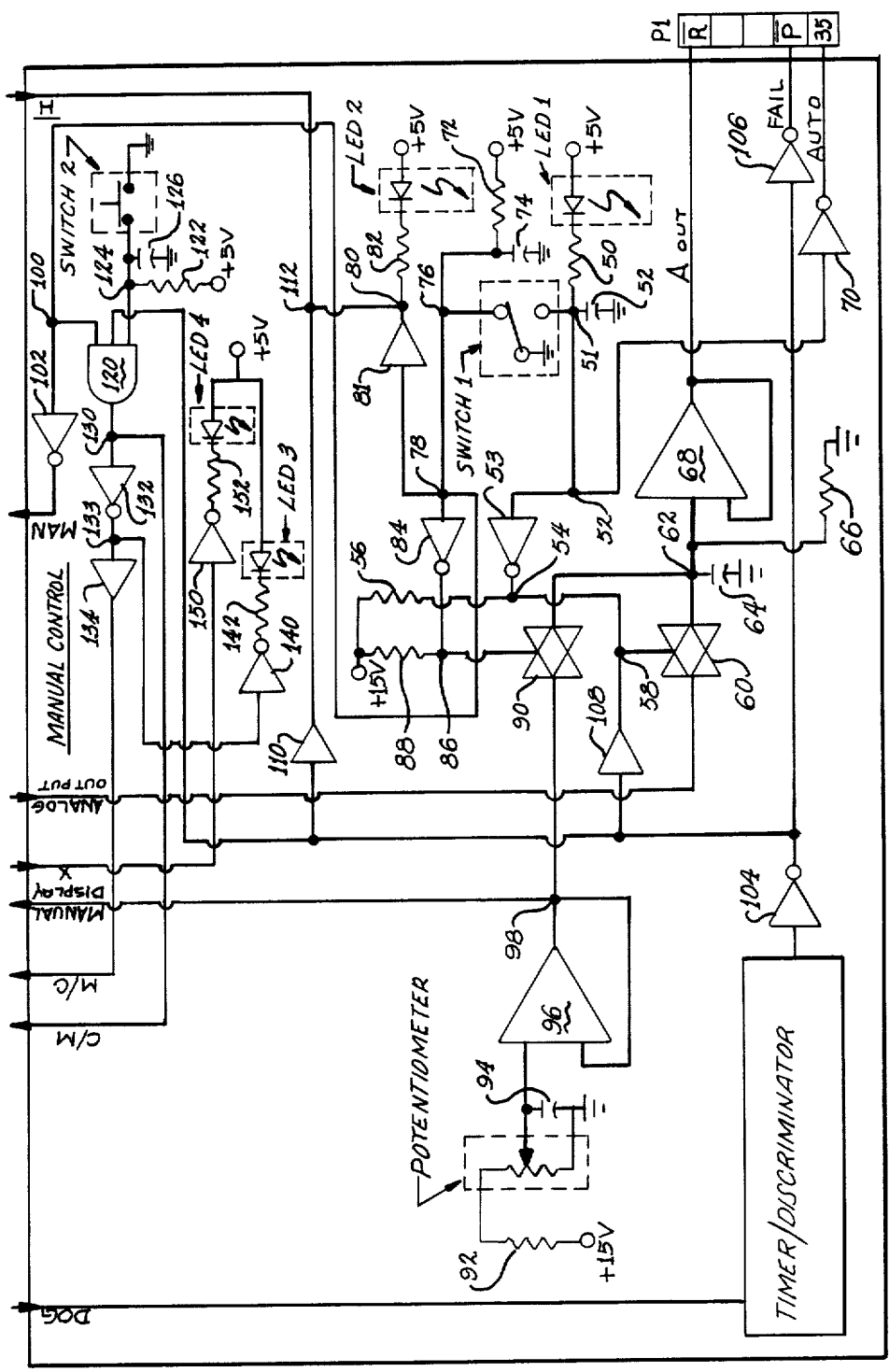
FIG. 7 is a schematic of the manual control device of a controller.

FIG. 7 shows the circuitry of the manual control device of FIG. 5. The primary control is switch 1 which positioned in the up position sets the controller to manual control and when in the down position sets the controller to automatic control. A five volt power supply is connected to light emitting diode LED 1 and then dropped across resistor 50 to node 51. A filter capacitor 52 removes any switching transients and high frequency spikes off of this line. When switch 1 is in the lower position, node 51 is grounded. Node 52 is, therefore, at a low potential and LED 1 is lit. A logic inverting device, item 53, inverts a signal to a high signal at node 54. A 15 volt power supply is dropped across pull-up resistor 56. Node 58 therefore is at a high potential and activates solid state switch 60. Solid state switch 60 then transmits the analog output signal to node 62. Capacitor 64 acts as a filter for any spikes or alternating current signal on this line. Resistor 66 provides a zero voltage reference when no analog input is available. The signal passes then from node 62 to an output buffer amplifier 68 and then to line labeled A-out. Therefore, the analog output from the controller is the analog output from the analog to digital converter on FIG. 5. This signal is impressed on signal pad $\overline{R}$ on the printed circuit connector P1. The signal from node 52 is also passed to the logical inverter device 70 where it is transmitted as a high signal on the signal line AUTO and is impressed on pad 35 of the printed circuit connector P1. The AUTO line passes to field devices to instruct them that the controller is in automatic mode and that the output on A-out is the analog signal calculated by the controller. Similarly, when the switch 1 is in manual position or the up position, a five volt supply is dropped across resistor 72, filtered by capacitor 74 and impressed on node 76. When switch 1 is in the manual position, node 76 is low. Similarly, node 78 is also low. When node 78 is low, buffer 81 transmits the low signal to node 80. A five volt power supply is connected to LED 2 and dropped across resistor 82. Since node 80 is low, LED 2 is lit. This signifies that the controller is in manual mode. A logic inverter 84 takes this low signal and converts it to a high signal at node 86. A plus 15 volt signal is dropped across resistor 88 to node 86. Since logic inverter 84 is inverting the signal at node 78 and making it high, solid state switch 90 is activated. A plus 15 volts is dropped across resistor 92 to the manual setting potentiometer. A capacitor 94 is used to filter this signal. This potentiometer signal is sent to output buffer amplifier 96 to node 98. From node 98, this manual setting is passed through solid state switch 90 to node 62, through node 62 to the output buffer amplifier 68, and this signal is then impressed on the output line A-out. Output line A-out again goes to pad $\overline{R}$ on the connector P1. So, when switch 1 is in the manual position, the manual setting of the potentiometer becomes the analog output signal sent to the field devices through connector P1. A signal also goes from node 98 to the manual display devices so that the display devices shown in FIG. 6 can be activated with the setting of the manual potentiometer. Several other functions also occur within the manual control section of the controller. The signal on node 78 is impressed on the signal line to node 100 where it is passed to logic inverter 102 and then impressed in the alternate state on signal line MAN. MAN, as was shown in FIG. 5, is fed back to VIA0 and then onto the data bus to inform the microprocessor that the controller has been set in manual mode. Similarly, a signal DOG comes from VIA0. DOG is a pulse alternating between high and low that repeats every 50 millisecond. It is fed to a timer discriminator which times the signal, compares it to an internal timer and if the signal ceases to oscillate, outputs a high signal to logic inverter 104. 104 passes this signal onto an additional logic inverter 106 where it is impressed on pad $\overline{P}$ of connector P1. This then goes to a digital field device to inform the digital field device that the controller microprocessor has failed. This signal is also passed to buffer 108 which is connected to node 58. In this manner, in case the microprocessor has failed, buffer 108 drives node 58 low. If solid state switch 60 had been activated by setting the switch 1 into automatic, buffer 108 will take this high signal and drive it low, preventing the analog output of the microprocessor from being transmitted as an output. The signal from the inverter 104 is also fed to a buffer 110 connected to node 112. If the timer discriminator has determined that the microprocessor has failed and a low signal therefore is put out by inverter 104, buffer 110 drives the signal at node 112 low and lights LED 2. If switch 1 had been set in the automatic mode, we would have a situation where LED 1 would be lit because node 51 was low and LED 2 would be simultaneously lit because node 80 was low. This informs the operator, visually from the outside of the controller, that the microprocessor in the controller has failed because both LED 2 and LED 1 would be lit at the same time. A signal $\overline{H}$ also is connected to node 112. $\overline{H}$ is connected as mentioned before to digital output line DO7 in FIG. 5A. If the controller has been set in soft manual mode, that is, the condenser has informed the controller that it should be set at a manual setting, then digital output line DO7 will alternate between a high and a low state. This will cause node 12 to go alternately high and then low, thus blinking LED 2. The operator then, in observing the front of the panel, can see that if LED 2 is blinking, then he knows that the controller is set in computer or soft manual control. The signal from the inverter 104 is also fed to AND GATE 120. Also, the signal from node 100 is fed to the AND GATE as is a signal from switch 2. A pull-up resistor 122 impresses five volts on node 124 and capacitor 126 filters this signal. These signals are also fed to the AND GATE 120. A momentary switch, switch 2, can ground node 124. AND GATE 120 passes a low signal if any signal inputted to it is low. In order to pass a high signal, all signals into AND GATE 120 must be high. AND GATE 120 is to control the displays on the front of the controller. In the simplest case, the fail signal from inverter 104 is high. Node 78 from switch 1 would be high when the switch is in the lower or automatic position, therefore, node 100 would be high and switch 2, being not depressed, would cause the signal on node 124 to be high. Therefore, all signals to AND GATE 120 would be high and the output to node 130 would be high. This signal at node 130 is outputted on signal line C/M. As will be explained below, this signal is sent to the display devices. An inverter 132 then turns this signal low where it goes through logic inverter 140 where it becomes again high. Since it is high, both ends of resistor 142 would be high and LED would not be lit, signifying that the display units are displaying process variable on Display 1 and set point on Display 2. The signal from node 133 then goes through buffer 134 and is output on signal line M/C. As can be seen, when C/M is high, M/C is low, and conversely, when C/M is low, M/C is high. Now, if switch 2 is depressed, node 124 is pulled low. This causes the AND GATE to output a low signal on signal line 130. Invertor 132 transfers the low signal on line 130 to a high signal on node 133. Invertor 140 then turns the high signal on mode 133 to a low signal allowing current to pass from the plus five volt power supply through LED 3 and through resistor 142. Therefore, LED 3 is lit signifying that the output on the display is the output on Display 1 and the manual setting of the potentiometer on Display 2. A signal X is also inputted into the manual control. The signal X comes from VIA1 of FIG. 5 and is high when the controller is communicating with the outside world. This signal line then causes inverter 150 to turn this signal low and drop the plus five volts across LED 4 and resistor 152. This causes LED 4 to be lit whenever the controller is communicating with the condenser.

Referring back to FIG. 5A, it can now be seen how control lines C/M and M/C control which measurements are being placed on Display 1 and Display 2. Signal lines C/M and M/C are always the compliment of one another. When C/M is high, M/C is low and conversely, when M/C is high, C/M is low. When a signal line is high, the device to which it is connected does not transmit and when the signal line is low, the device does transmit. To refresh our memory, the manual display signal from the manual control device is fed on signal line 3 to analog to digital converter A/D 40. Here, the analog signal is converted to an eight bit digital signal. This signal is fed to a data selector/multiplexer back to the bidirectional data bus. This allows the manual setting of the potentiometer to be fed back to the microprocessor as a digital signal. The signals are also fed to Octal D Flip/Flop Tri-State device 43. A signal representation of the set point SP of the process variable is also fed from the bidirectional data bus to an Octal D Flip/Flop Tri-State device 42. The output of devices 42 and 43 are wired together into a display driver 46 and then to Display 2. Similarly, the analog out signal on line 2 is fed to analog to digital converter A/D 41. Here, the signal is converted to an eight bit digital signal and fed to Octal D Flip/Flop Tri-State device 44. The digital signal representing the process variable is fed from the bidirectional data bus to Octal D Flip/Flop Tri-State device 45. The output from devices 44 and 45 are wired together and go to Display Driver 47 and then to Display 1. Signal line M/C on line 4 is converted to devices 42 and 45. Signal line C/M is converted to devices 43 and 44. When node 130 of FIG. 7 is low, then signal line C/M is low and signal line M/C is high. In this case, devices 43 and 44 transmit and devices 42 and 45 do not transmit. Display 2 becomes the manual setting of the potentiometer and Display 1 becomes the output of the controller. When node 130 is high, C/M is high and M/C is low. Devices 43 and 44 do not transmit but devices 42 and 45 do transmit. Then Display 1 becomes the process variable and Display 2 becomes the set point.

Hardware - Condenser

Figure 8:
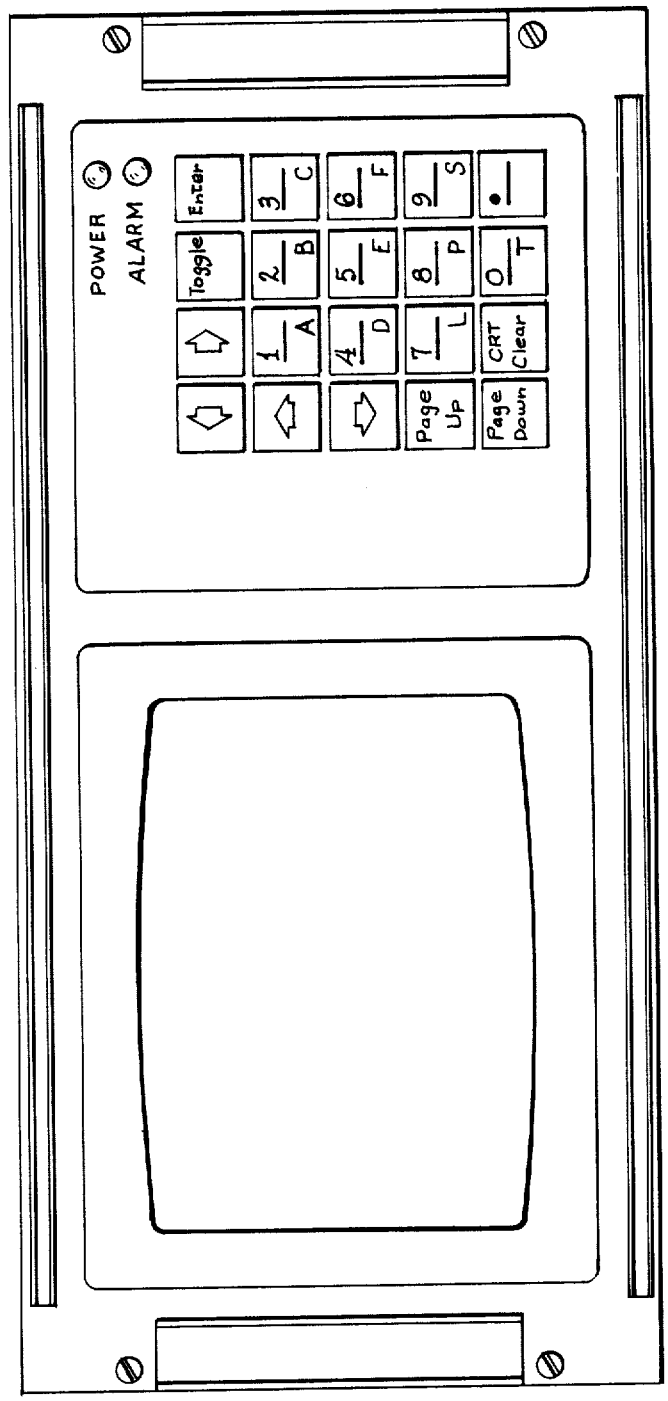
FIG. 8 is an illustration of the front face of the condenser.

FIG. 8 is a visual representation of the front panel of the condenser unit. This shows the video display, the key pad and two indicator lamps, one for power and one for alarm.

Figure 9:
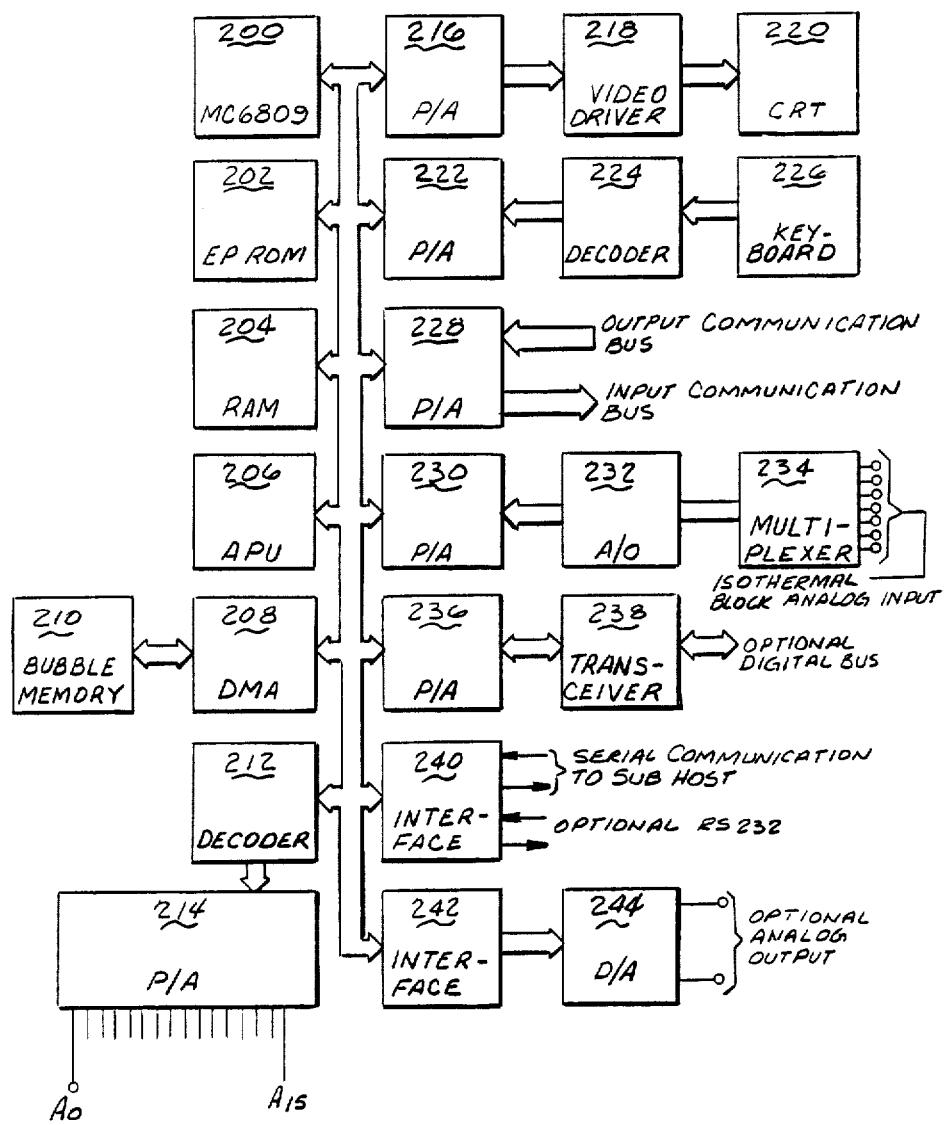
FIG. 9 is a block diagram of the elements within the condenser.

FIG. 9 is a block diagram of the internal workings of the condenser unit. A microprocessor 200 is provided. Microprocessor can be a Motorola MC6809 type device. This is connected to the computer buses, which includes a bus for data, for control and a third bus for address lines. Connected also to this bus is an EPROM or erasable programmable read only memory 202. Random access memory (RAM) 204 is also connected to the computer bus. An arithmetic processing unit 206 is provided for high level calculating power. A bubble memory 210 is provided and is controlled by direct memory access device 208. An address decoder 212 is connected to the computer buses and drives a programmable interface adapter (PIA) 214 which drives the 16 attention lines A0 through A15. A parallel interface adapter 216 allows signals to go from the computer bus to a video driver decoder 218 which drives the CRT 220. The key pad or keyboard 226 sends its signals to a keyboard decoder 224 and then to a peripheral interface adapter (PIA) 222 and eventually to the computer buses. A peripheral interface adapter 228 is the input-/output device which allows the output communication bus and the input communication bus from the controllers to be read by the microprocessor in the condenser unit. The isothermal block analog inputs from the isothermal field devices go into a multiplexer 234 which then sends one signal at a time to an analog to digital converter with internal interface adapter 232 such as an INTERSIL 7109 device. A parallel interface adapter 236 allows interconnection to an optional digital bus. Serial communications to the subhost and to optional RS 232 lines is provided by appropriate communication interface adapters 240, 242. A digital to analog converter 244 with internal interface adapter such as an BECKMAN 7581C device provides an optional analog output from the condenser. The internal workings of the devices in the condenser are conventional as is known in the microprocessor arts. All the devices, however, are memory mapped.

FIG. 10 is a memory map of the condenser's memory. The memory locations are given in hexadecimal notation. The dollar sign preceding the numbers indicates that the numerical representation is in hexadecimal format. The random access memory 204 is broken down into several memory locations as it is located on memory cards. The input/output devices also have specific memory locations. Generally speaking, all input/output devices reside in memory location EFFF through EC00. FIG. 10 gives a breakdown of the specific locations for the memory access for each of the particular input and output devices.

Hardware - Subhost

Figure 11:
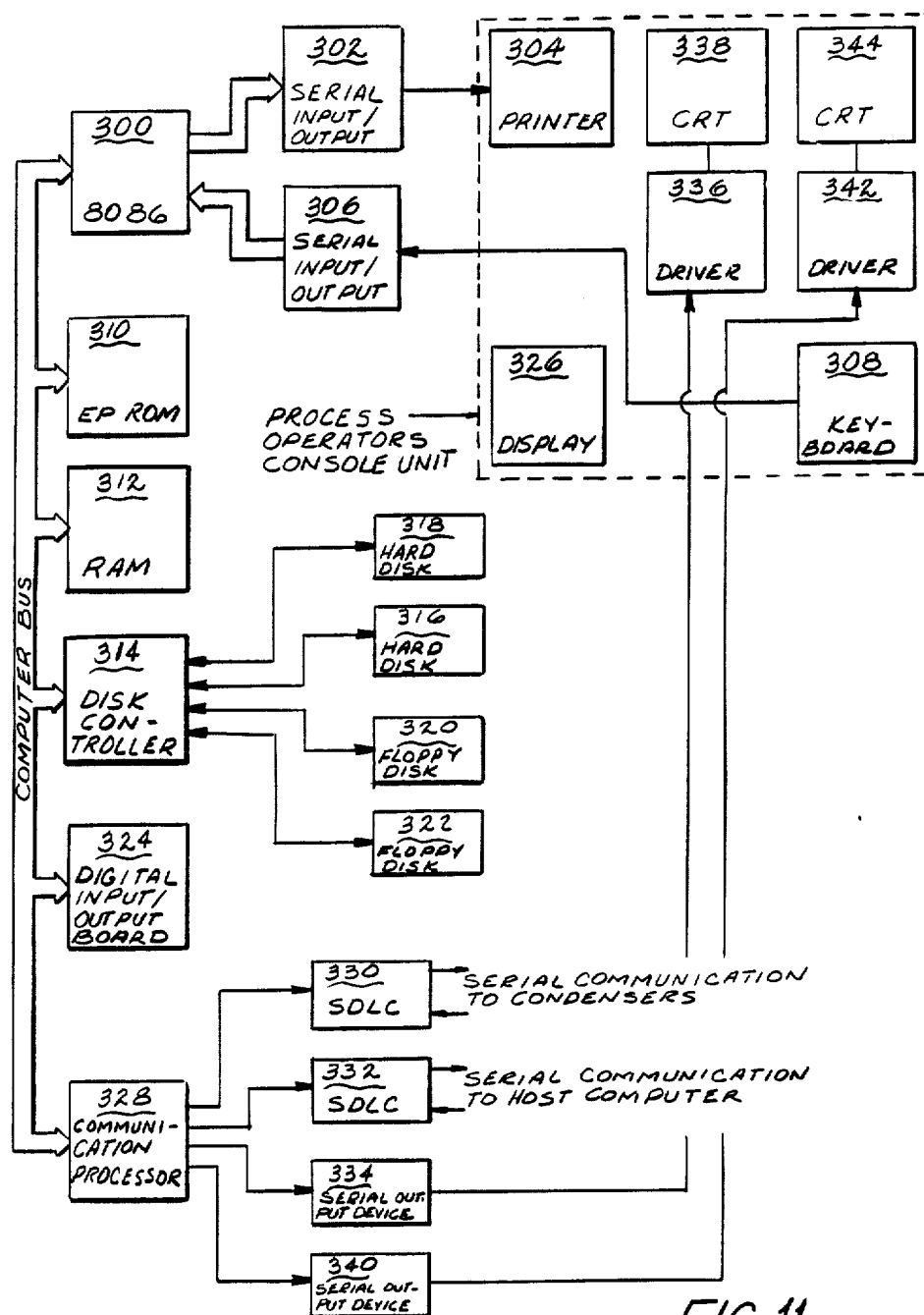
FIG. 11 is a block diagram of the elements within a subhost.

The subhost is a microprocessor-based, stand-alone computer system as shown in FIG. 11, which includes a process operator's console unit. On the process operator's console unit is provided a printer, an alarm interface, two CRT tubes and a keyboard. The microprocessor 300 is an Intel 8086 type microprocessor with the 8087 math coprocessor. This is connected to computer buses which include the address lines, control bus and data buses. Also attached to the computer buses is an erasable programmable read only memory EPROM 310, random access memory 312, a disk controller 314, an intelligent communication processor 328 and a digital input/output board 324. The microprocessor 300 is connected to a serial input/output device 302 which is connected to a printer 304. A keyboard 308 is connected to a serial input/output device 306 which sends its signals to the microprocessor. The disk controller 314 can drive a series of Winchester hard drives which can be of the 15 megabyte variety and are represented by 316 and 318. The disk controller can also drive two floppy disk drives, such as, item 320 and 322, which can be 650 kilobyte 5¼ inch type floppy drives. A digital output device 324 is used to activate solid state relays for alarming and activating lamps on the face of the process operator's console as is indicated by item 326. The intelligent communications processor 328 is connected to an SDLC, synchronous data link communication, device 330 which provides the serial communication to the condensers which are associated with the subhost. The intelligent communication processor also provides an SDLC communication module 332 which provides serial communication to a host computer. Two serial output devices 334 and 340 are used to drive the CRTs. Serial output device 334 is connected to CRT driver 336 which is connected to CRT 338. Serial output device 340, similarly, is connected to the video driver 342 which drives CRT 344. The operator, through the keyboard, can call up status and alarm symbols on one CRT, such as 338, and call up loop identification information on the second CRT 334. Internal alarming is also available on the alarm display board 326. At the operator's command, communication can be initiated by the subhost down through the condenser to any controller within this subhost command. The operator can also change process parameters or place any controller in the soft or computer manual control.

Standard Loop Record - Controller

In order to understand the unique nature of the communications between the controllers and the condenser, the condenser and the subhost, it is first important to understand how loop records are stored within the condenser and the controller and what these records represent. All of the tables which follow have a similar structure with codes which represent significant factors. A dollar sign before any number indicates that number is in hexadecimal notation system. Bit 0 is the most significant bit in a byte or a group of bytes. The following is a condensation of what some of the codes in these tables represent:

*C = this value is also in control common

*S = this value is changed by the computer

*FP = this is a floating point value, and it is to be displayed as is

*FM = this is the floating point value in bytes 36 through 39 and requires a special conversion to display the span of the loop in engineering units

*FE = this is a floating point process variable (0 through 32767) and is to be displayed using the engineering units conversion

*FS = this is a floating point process variable (0 through 32767) and is to be displayed using the semi-engineering units conversion

*FO=this is a floating point loop output value (0 through 32767) and is to be displayed with a trailing percent sign using an output conversion.

Referring now to Table I, a description of a standard loop record, as it is stored in a controller, is given. First, the number of the byte, a short ID of the byte name, the particular bit within the byte and then a description of the information that is contained therein. For instance, the first two bytes in a standard loop record, that is, byte 0 and byte 1, contain the ID of the controller. This ID resides in bits 0 through 15. The loop identification is a code as is outlined in Table I. The next three bytes of information, that is, bytes 2, 3 and 4, also identify the controller by telling its rack number, which condenser it is associated with and which process operator's console it is associated with. Byte 5 tells the controller which input subroutine is to be used on the information received from the field devices. Byte 7 also tells the controller which algorithm to use to process the control. The primary part of the standard loop record continues through byte 107. The information contained in the first 107 bytes is basically fixed or set by the computer. Bytes 108 through 139 are variable data which is calculated by the computer. The information in any standard loop record is always in the same location within the record. In this manner, when the condenser asks for communication, a set portion of the memory which holds the standard loop record can be sent to the condenser so that information is passed upwards on a timely basis.

TABLE I

| BYTE | BYTE NAME | BIT | DESCRIPTION |
|---|---|---|---|
| DESCRIPTION OF PRIMARY PART OF STANDARD LOOP RECORD | | | |
| 0-1 | ID | 0-15 | Loop identification (5 digits, 00000-59999) 1st digit = 0-5 for area identification 2nd digit = Furnace no., channel no., etc. 3rd digit = Loop function character, typically: 0 = T, Temperature loops 1 = A, Analyzer loops 2 = B, Bushing temperature loops 3 = C, Computed loops (ratio, average) 4 = D, Data logging loops 5 = E, Electrode monitoring loops 6 = F, Flow loops 7 = L, Level loops 8 = P, Pressure loops 9 = S, Speed loops or system loops 4th & 5th digits = Sequential number within an area/type |
| 2 | POCNUM | 0-3 | Process Operator's Console number (1-15, 0 if none) |
|  |  | 4-7 | Subhost number (normally 1-15, 0 if no Subhost) |
| 3 | FACEP | 0-4 | Face panel (Condenser) number (1-31) |
|  |  | 5-7 | Isothermal block if thermocouple input (1-7) |
| 4 | RKCTL | 0-3 | Rack number (1-12) |
|  |  | 4-7 | Controller number within the rack (1-9) |
| 5 | INSUB | 0 | Spare |
|  |  | 1-2 | Input source (allowed subroutines in parentheses) 0 = No input (0,4,5,6,7,8,11) 1 = Digital input 2 = Analog input (0,4,5,6,7,11) 3 = Input from another loop (1,2,3,9) |
|  |  | 3-7 | Input subroutine 0 = No input subroutine 1 = Input from MEAS of loop in INMAD 2 = Input from OUTPT of loop in INMAD 3 = Input from SETPT of loop in INMAD 4 = Input scaling without bad input check 5 = Input scaling with bad input check 6 = Thermocouple input 7 = Orifice plate flow with zero check 8 = Oxygen probe (temperature loop ID in INMAD, millivolt |

TABLE I-continued

| BYTE | BYTE NAME | BIT | DESCRIPTION | |
|---|---|---|---|---|
| | | | loop ID in INMAD2) | |
| | | | 9 = Ratio (MEAS of INMAD)/ | |
| | | | (MEAS of OUTAD) | |
| | | | 10 = Spare | |
| | | | 11 = Orifice plate flow without | |
| | | | zero check | |
| | | | 12-15 = Spare | |
| | | | 16 = Electrode resistance | |
| | | | monitoring | |
| | | | 17-31 = Spare | |
| 6 | AINPT | 0-3 | Spare | |
| | | 4-7 | Analog input multiplexer specification | |
| | | | 0 = Not multiplexed input | |
| | | | 1-8 = Multiplexer input point | |
| | | | number | |
| 7 | ALGOW | 0-4 | Algorithm option | |
| | | | 0 = Spare | |
| | | | 1 = Integral control | |
| | | | 2 = Integral & proportional | |
| | | | control | |
| | | | 3 = Integral, proportional, & | |
| | | | non-linear control | |
| | | | 4 = Integral, proportional, | |
| | | | non-linear, & input | |
| | | | derivative control | |
| | | | 5 = Average 1 through 6 process | |
| | | | variables | |
| | | | 6 = Obtain MEAS, error check, | |
| | | | alarm | |
| | | | 7-9 = Spare | |
| | | | 10 = Ratio (subroutine 9 must | |
| | | | have been selected in | |
| | | | INSUB, output options in | |
| | | | MAUTO/CTLACT must be set to | |
| | | | send the output of this | |
| | | | loop to SETPT of loop in | |
| | | | OUTAD) | |
| | | | 11-15 = Spare | |
| | | | 16 = Integral, proportional, | |
| | | | non-linear, & error | |
| | | | derivative control | |
| | | | 17 = Timed pulse duration | |
| | | | 18-31 = Spare | |
| | | 5-7 | Sequence number in Controller for | |
| | | | polling or for front panel display | |
| | | | (see CTLACT, bit 2). Values 0-7 | |
| | | | are for sequence positions 1-8, | |
| | | | respectively. | |
| 8-9 | RAWD | 0-15 | Raw data reading | *S |
| 10-11 $0A-$0B | FLCOT | 0-15 | Filter constant (minimum value) | |
| 12 $0C | ERALA | 0-1 | Current deviation alarm condition | *S |
| | | | 0-1 = No alarm | |
| | | | 2 = Deviation low alarm | |
| | | | 3 = Deviation high alarm | |
| | | 2-3 | Deviation deadband (must be less | |
| | | | than ERLIM/2) | |
| | | | 0 = 0.1% of span | |
| | | | 1 = 1.0% of span | |
| | | | 2 = 5.0% of span | |
| | | | 3 = 10.0% of span | |
| | | 4-7 | Deviation high alarm action | |
| | | | Bit 4 = 1 to put loop on manual | |
| | | | Bit 5 = 1 to hold the output | |
| | | | Bit 6 = 1 for audible signal | |
| | | | Bit 7 = 1 to print a message | |
| 13 $0D | ERALP | 0-3 | Deviation low alarm action | |
| | | | Bit 0 = 1 to put loop on manual | |
| | | | Bit 1 = 1 to hold the output | |
| | | | Bit 2 = 1 for audible signal | |
| | | | Bit 3 = 1 to print a message | |
| | | 4-7 | Spare | |
| 14 $0E | INALA | 0-1 | Current input alarm condition | *S |
| | | | 0-1 = No alarm | |
| | | | 2 = Input low alarm | |
| | | | 3 = Input high alarm | |
| | | 2-3 | Input deadband | |
| | | | 0 = 0.1% of span | |
| | | | 1 = 1.0% of span | |

TABLE I-continued

| BYTE | BYTE NAME | BIT | DESCRIPTION | |
|---|---|---|---|---|
| | | | 2 = 5.0% of span | |
| | | | 3 = 10.0% of span | |
| | | 4-7 | Input high alarm action | |
| | | | Bit 4 = 1 to put loop on manual | |
| | | | Bit 5 = 1 to hold the output | |
| | | | Bit 6 = 1 for audible signal | |
| | | | Bit 7 = 1 to print a message | |
| 15 $0F | INALP | 0-3 | Input low alarm action | |
| | | | Bit 0 = 1 to put loop on manual | |
| | | | Bit 1 = 1 to hold the output | |
| | | | Bit 2 = 1 for audible signal | |
| | | | Bit 3 = 1 to print a message | |
| | | 4-5 | Input out of limits counter (counting to 4 causes an input alarm) | *S |
| | | 6-7 | Spare | |
| 16 $10 | INBAD | 0-1 | Input bad counter | *S |
| | | 2 | Loop has an alarm | *S |
| | | 3-4 | Spare | |
| | | 5-7 | Counter for FILTER routine | *S |
| 17 $11 | OUALA | 0-1 | Output in alarm status | *S |
| | | | 0-1 = No alarm | |
| | | | 2 = Output low alarm | |
| | | | 3 = Output high alarm | |
| | | 2-3 | Output deadband | |
| | | | 0 = 0.1% of span | |
| | | | 1 = 1.0% of span | |
| | | | 2 = 5.0% of span | |
| | | | 3 = 10.0% of span | |
| | | 4-7 | Output high alarm action | |
| | | | Bit 4 = 1 to put loop on manual | |
| | | | Bit 5 = 1 to hold the output | |
| | | | Bit 6 = 1 for audible signal | |
| | | | Bit 7 = 1 to print a message | |
| 18 $12 | OUALB | 0-3 | Output low alarm action | |
| | | | Bit 0 = 1 to put loop on manual | |
| | | | Bit 1 = 1 to hold the output | |
| | | | Bit 2 = 1 for audible signal | |
| | | | Bit 3 = 1 to print a message | |
| | | 4-7 | Spare | |
| 19 $13 | BIOPP | 0-2 | Bias decay rate | |
| | | | 0 = None | |
| | | | 1 = 0.01% of full scale | |
| | | | 2 = 0.02% of full scale | |
| | | | 3 = 0.03% of full scale | |
| | | | 4 = 0.06% of full scale | |
| | | | 5 = 0.12% of full scale | |
| | | | 6 = 0.24% of full scale | |
| | | | 7 = 0.30% of full scale | |
| | | 3 | Spare | |
| | | 4-7 | Filter count: Number of times the input change has exceeded the limit without changing direction | *S |
| 20 $14 | MAUTO | 0-1 | Where to store the output | |
| | | | 0 = Output goes to the field | |
| | | | 1 = Output option is in bits 6-7 of CTLACT | |
| | | | 2 = Output goes nowhere | |
| | | | 3 = Spare | |
| | | 2 | Start-up condition on restart | |
| | | | 0 = Restart on manual | |
| | | | 1 = Restart on last condition | |
| | | 3 | Bumpless transfer suppressed indicator | |
| | | | 0 = Bumpless transfer when going to auto | |
| | | | 1 = No bumpless transfer | |
| | | 4-5 | Type of non-linear control action | |
| | | | 0 = None | |
| | | | 1 = Non-linear integral control | |
| | | | 2 = Non-linear proportional control | |
| | | | 3 = Non-linear integral & proportional control | |
| | | 6 | Loop can be a slave indicator | |
| | | | 0 = Loop cannot be a slave | |
| | | | 1 = Loop can be a slave | |
| | | 7 | Loop is a slave indicator (cascade light on) | |
| | | | 0 = Loop is not a slave | |
| | | | 1 = Loop is a slave (receives | |

TABLE I-continued

| BYTE | BYTE NAME | BIT | DESCRIPTION |
|---|---|---|---|
| | | | data from a loop) |
| 21 $15 | CTLACT | 0 | Where to add bias<br>0 = Add bias to deviation<br>1 = Add bias to output |
| | | 1 | Type of control action<br>0 = Direct action<br>1 = Reverse action |
| | | 2 | Enable display of loop on front of controller<br>0 = Loop not displayed on controller<br>1 = Loop is displayed on controller |
| | | 3 | Link open/closed indicator<br>0 = Link is open (loop should not be scanned)<br>1 = Link is closed (loop should be scanned) |
| | | 4 | Auto/Manual operation indicator<br>0 = Auto/Manual works any time<br>1 = Auto/Manual works only in engineering mode |
| | | 5 | Setpoint ramping indicator<br>0 = No setpoint ramping<br>1 = Has setpoint ramping |
| | | 6–7 | If enabled in bits 0-1 of MAUTO, output of this loop<br>0 = Goes to MEAS of loop in OUTAD<br>1 = Goes to SETPT of loop in OUTAD<br>2 = Goes to BIAS of loop in OUTAD<br>3 = Goes to KP of loop in OUTAD |
| 22 $16 | EDTPO | 0–2 | Spare |
| | | 3–7 | Display units<br>0 = Blank   16 = Log<br>1 = Percent  17 = Ratio<br>2 = Deg F.  18 = Lbs/Hr<br>3 = CFH   19 = Deg C.<br>4 = MCFH  20 = Spare<br>5 = PSI    21 = Ohms<br>6 = In H2O  22 = CFM<br>7 = In Hg   23 = Gals<br>8 = In Gl   24 = KW<br>9 = GPH   25 = Watt<br>10 = mV    26 = Inch<br>11 = GPM   27 = Spare<br>12 = PSIA   28 = Spare<br>13 = Lbs    29 = Spare<br>14 = Volts   30 = Spare<br>15 = Amps  31 = Spare |
| 23 $17 | SETPLP | 0–2 | Setpoint change limit<br>0 = 100.0% of span<br>1 = 50.0% of span<br>2 = 20.0% of span<br>3 = 10.0% of span<br>4 = 5.0% of span<br>5 = 2.5% of span<br>6 = 1.0% of span<br>7 = 0.5% of span |
| | | 3–4 | Used when displaying output on CRT<br>0 = Blank<br>1 = Percent open (O) for valve<br>2 = Percent closed (C) for valve<br>3 = Spare |
| | | 5–6 | Output change limit<br>0 = 100% of span<br>1 = 10% of span<br>2 = 5% of span<br>3 = 1% of span |
| | | 7 | Stop control option indicator<br>0 = Stop control not being used, STPAD ignored.<br>1 = Stop control is being used STPAD must contain the ID of the stop control loop. |
| 24–25 $18–$19 | STPAD | 0–15 | If the stop control option in SETPLP is on, and the loop whose ID is in STPAD stops control, the |

TABLE I-continued

| BYTE | BYTE NAME | BIT | DESCRIPTION | |
|---|---|---|---|---|
| | | | present loop will also stop control. | |
| 26–27 $1A–$1B | OUTAD | 0–15 | Contains ID of loop to send output to if selected in MAUTO and CTLACT | |
| 28 $1C | SCALP | 0–7 | Scale factor for controller panel display | |
| 29 $1D | THERM | 0–2 | Type of thermocouple being read<br>0 = None (bypass curve fitting)<br>1 = Type J (Iron vs Constantan)<br>2 = Type K (Chromel vs Alumel)<br>3 = Type R (Pt vs Pt, 13% Rh)<br>4 = Type B (Pt, 6% Ph vs Pt, 30% Rh)<br>5 = Type C (W, 5% Re vs W, 26% Re)<br>6 = Type S (Pt vs Pt, 10% Rh)<br>7 = Spare | |
| | | 3 | Thermocouple input change checking<br>0 = No change check<br>1 = Change check (i.e. break detection) | |
| | | 4–5 | Thermocouple change check limits<br>0 = 1% of span<br>1 = 5% of span<br>2 = 10% of span<br>3 = 50% of span | |
| | | 6 | RC Filter (0= Off, 1 = On) | |
| | | 7 | Spare | |
| 30 $1E | TMCOM | 0 | Thermocouple cold junction compensation<br>0 = Remote compensation<br>1 = Local (isothermal block) compensation | |
| | | 1–3 | Remote compensation type conversion<br>0 = Type R (150° F.)<br>1 = Type R (200° F.)<br>2 = Type R (32° F.)<br>3–7 = Spare | |
| | | 4 | Input filtering indicator<br>0 = No input filtering<br>1 = Input filtering is used | |
| | | 5–6 | Filter type<br>0 = No filter<br>1 = 1/2/4/8<br>2 = 1/4/16/64<br>3 = Spare | |
| | | 7 | Input direction last time polled<br>0 = Increasing<br>1 = Decreasing | *S |
| 31 $1F | RVTIME | 0 | Furnace reversal indicator<br>0 = This loop not affected by furnace reversal<br>1 = This loop is affected by furnace reversal | |
| | | 1–7 | Control delay (seconds) after furnace reversal | |
| 32–33 $20–$21 | INMAD | 0–15 | Loop ID of where input comes from if selected in INSUB | |
| 34–35 $22–$23 | INMAD2 | 0–15 | Loop ID when INMAD is not sufficient because more than one loop is needed (currently only needed by input subroutine 8) | |
| 36–39 $24–$27 | CONA | *FM | Scaling constants in: Y=CONA*X+CONB<br>Y = Process variable in engineering units<br>CONA = Span of process variable in eng. units/32767 | |
| 40–43 $28–$2B | CONB | *FP | X = Value before conversion<br>CONB = Value in engineering units for X = 0.0 | |
| 44–47 $2C–$2F | ERLIM | *FS | Deviation limit (must be >2*deadband, see ERALA) | |
| 48–51 $30–$33 | INHIL | *FE | Input high limit | *C |
| 52–55 $34–$37 | INLOL | *FE | Input low limit | *C |
| 56–59 $38–$3B | OPLIM | *FO | Output high limit | *C |
| 60–63 $3C–$3F | OPLOP | *FO | Output low limit | *C |
| 64–67 | KI | *FP | Integral gain (except averaging | *C |

TABLE I-continued

| BYTE | BYTE NAME | BIT | DESCRIPTION | |
|---|---|---|---|---|
| $40–$43 | | | algorithm loops) | |
| | | | For loops with averaging algorithm only: | |
| 64–65 | AVID1 | 0–15 | ID of first loop to average (must be present) | |
| 66–67 | | 0–15 | Storage for IFIX(MEAS) from first loop | *S |
| 68–71 $44–$47 | KP | *FP | Proportional gain (except averaging algorithm) | *C |
| | | | For loops with averaging algorithm only: | |
| 68–69 | AVID2 | 0–15 | ID of second loop to average, or 0 if not used | |
| 70–71 | | 0–15 | Storage for IFIX(MEAS) from second loop | *S |
| 72–75 $48–$4B | KNL | *FP | Non-linear gain (except pulsed output loops, or loops with averaging algorithm) | *C |
| | PULGTH | *FP | For pulsed output loops only: Pulse length in seconds | |
| | | | For loops with averaging algorithm only: | |
| 72–73 | AVID3 | 0–15 | ID of third loop to average, or 0 if not used | |
| 74–75 | | 0–15 | Storage for IFIX(MEAS) from third loop | *S |
| 76–79 $4C–$4F | KDECO | *FP | Derivative rate, normally 0.02 to 5.0 decays per minute (except pulsed output and averaging algorithms) | *C |
| | | | For pulsed output loops only: | |
| 76 | OUTBIT | 0–7 | Specifies which pair of output bits will be used for pulsed digital output (1–4) | |
| 77 | FREQ | 0–7 | Waveform factor for output pulse | |
| 78 | CLKDLY | 0–7 | Count for settle time after tap change | |
| | | | For loops with averaging algorithm only: | |
| 76–77 | AVID4 | 0–15 | ID of fourth loop to average, or 0 if not used | |
| 78–79 | | 0–15 | Storage for IFIX(MEAS) from fourth loop | *S |
| 80–83 $50–$53 | KDGAI | *FP | Derivative gain (except averaging algorithm) | *C |
| | | | For loops with averaging algorithm only: | |
| 80–81 | AVID5 | 0–15 | ID of fifth loop to average, or 0 if not used | |
| 82–83 | | 0–15 | Storage for IFIX(MEAS) from fifth loop | *S |
| 84–87 $54–$57 | BMPTFR | *FP | Location for data from external loop needed for bumpless transfer (except averaging algorithm) | *S |
| | | | For loops with averaging algorithm only: | |
| 84–85 | AVID6 | 0–15 | ID of sixth loop to average, or 0 if not used | |
| 86–87 | | 0–15 | Storage for IFIX(MEAS) from sixth loop | *S |
| 88–91 $58–$5B | INPTFR | *FP | Location for data from external loop in INMAD, used by input transfer routine | *S |
| 92–95 $5C–$5F | CNSTNT | *FP | Constant for RC filter | |
| | | | For thermocouple input subroutine only: | |
| 96–99 $60–$63 | COLD | *FP | Cold junction temperature (deg F) | *S |
| | | | For ratio input subroutine only: | |
| | INPTF2 | *FP | Data from MEAS of loop in OUTAD | *S |
| 100–103 $64–$67 | TRGSPT | *FE | Final setpoint at end of ramping | |
| 104–107 $68–$6B | RMPRAT | *FS | Ramping rate (engineering units per second) | |
| DESCRIPTION OF VARIABLE PART OF STANDARD LOOP | | | | |
| 108–111 $6C–$6F | MSGWRD | 0 | Current Auto/Manual status (0= Manual, 1= Auto) | *S |
| | | 1 | Auto/Manual status last time | *S |
| | | 2 | Current hard manual switch | *S |

TABLE I-continued

| BYTE | BYTE NAME | BIT | DESCRIPTION | |
|---|---|---|---|---|
| | | | reading (0= Off, 1= On) | |
| | | 3 | Hard manual status last time | *S |
| | | 4 | Control stopped (controller is holding output) | *S |
| | | 5 | Hold output indicator (command to controller) | *S |
| | | 6 | Spare | |
| | | 7 | Setpoint is ramping indicator | *S |
| | | 8 | Input bad (out of range of ADC) | *S |
| | | 9 | Deviation high error indicator | *S |
| | | 10 | Deviation low error indicator | *S |
| | | 11 | Output high error indicator | *S |
| | | 12 | Output low error indicator | *S |
| | | 13 | Input high error indicator | *S |
| | | 14 | Input low error indicator | *S |
| | | 15 | ADC bad (conversion did not finish in time) | *S |
| | | 16–23 | Spare byte | |
| | | 24 | Furnace reversal alarm | *S |
| | | 25–26 | Spare (reversed for alarms) | |
| | | 27–29 | Controller communications error status Bit 27 = 1 if no response from controller Bit 28 = 1 if protocol error detected Bit 29 = 1 if command reject response from Controller | *S |
| | | 30 | Loop needed by this loop cannot be found | *S |
| | | 31 | Error in setup of this loop | *S |
| 112–115 $70–$73 | MEAS | *FE | Measured value after INSUB and filtering | *S |
| 116–119 $74–$77 | SETPT | *FE | Setpoint (same units as MEAS) | *C |
| 120–123 $78–$7B | OUTPT | *FO | Output | *S *C |
| 124–127 $7C–$7F | BIAS | *FS | Value of bias to be added | *S *C |
| 128–131 $80–$83 | REST | *FP | Reset integral | *S |
| 132–135 $84–$87 | DSTO | *FP | Derivative contribution to output | *S |
| 136–139 $88–$8B | MANPOT | *FO | Manual potentiometer reading | *S |

Standard Loop Records - Condenser/Subhost

Both the condenser and the subhost contain not only the same 140 bytes of information that the controller contains but also contains additional information. The additional information is stored in the condenser and subhost in bytes 140 through 167. This condenser local part of the standard loop allows the condenser to use logic to call up only specific portions of the information in the standard loop of the controller for updating.

TABLE II

| DESCRIPTION OF CONDENSER LOCAL PART OF STANDARD LOOP | | | |
|---|---|---|---|
| BYTE | BYTE NAME | BIT | DESCRIPTION |
| 140 $8C | MSFLAG | 0 | Delete loop command needs to be sent to controller. |
| | | 1 | Delete loop command has been sent to controller-this loop has been logically deleted. |
| | | 2–4 | New Loop (or controller needs reloaded) indicators 0 = Not a new loop and controller not reloaded 1 = Entire loop data for a new loop has been sent to load the appropriate controller and needs to be reported to the subhost. 2 = Entire loop data has been sent to reload a controller and this reloading needs to be reported to the subhost. 5 = This is a new loop which needs to be sent to the appropriate controller. After the loop has been |

TABLE II-continued
DESCRIPTION OF CONDENSER LOCAL PART OF STANDARD LOOP

| BYTE | BYTE NAME | BIT | DESCRIPTION |
|---|---|---|---|
| | | | loaded, a report should be sent to the subhost.<br>6 = The controller responsible for this loop has requested a reloading of its loops. After this loop has been reloaded, a report should be sent to the subhost. |
| | | 5 | Some change in the loop data has been successfully sent to the appropriate controller and now needs to be reported to the subhost. This bit is a logical OR of all the bits in the SHFLAG array. |
| | | 6 | This loop has been deleted from the Controller, but logging report has not been sent to subhost. |
| | | 7 | Some change in the loop data needs to be sent to the appropriate controller. This bit is a logical OR of all the bits in the NDFLAG array. |
| 141-145<br>$8D-$91 | NDFLAG | all | Each bit corresponds to a block of 4 bytes in the loop record, counting sequentially from the ID byte up to the start of the condenser local area. A bit set means that one or more bytes in the block has (have) been changed (regardless of the origin of the change) and that the changed block has not yet been sent to the controller. |
| 146-150<br>$92-$96 | KBFLAG | all | Each bit corresponds to a block of 4 bytes in the loop record, counting sequentially from the ID byte up to the start of the condenser local area. A bit set means that one or more bytes in the block has (have) been changed, the change came from a keyboard entry (either the local condenser keyboard or the POC connected to the subhost), and that the changed block has not yet been sent to the controller. After the change has been sent to the controller, it should be reported to the subhost for logging; i.e. as bits in KBFLAG are cleared, the corresponding bits in SHFLAG should be set. |
| 151-155<br>$97-$9B | SHFLAG | all | Each bit corresponds to a block of 4 bytes in the loop record, counting sequentially from the ID byte up to the start of the condenser local area. A bit set means that one or more bytes in the block has (have) been changed, and the change should now be reported to the subhost for logging. The change may have been from a keyboard entry which has been successfully sent to the controller. It may also have been an alarm status change detected by the controller and sent to the condenser. |
| 156-167<br>$9C-$A7 | | | Spare |

Electrode Monitoring Loop Controller

Besides a standard loop, a controller can contain an electrode monitoring loop. Since the electrode monitoring can cover a number of electrodes, additional memory must be allocated for this type of function within the controller. The first two bytes of information, that is, byte 0 and byte 1, are the same as the were for the standard process loop. Bytes 2, 3 and 4 are also the same in that they define the identification of the particular controller. Byte 5, since it refers to input subroutines, will always contain the number 16 on bits 3 through 7. Referring back to the standard process loop, it was noted that the number 16 stood for electrode monitoring. The primary part of an electrode monitoring loop will contain 532 bytes of information, that is, byte 0 through bytes 531. The variable part of an electrode monitoring loop is contained in bytes 532 through bytes 1043. Referring to Table III, a coding is given for each electrode and what its voltage range, current range, resistance set point, resistance deviation limit, voltage amperage and resistance values are for what particular memory location.

TABLE III

| DESCRIPTION OF PRIMARY PART OF ELECTRODE MONITORING LOOP | | | |
|---|---|---|---|
| BYTE | BYTE NAME | BIT | DESCRIPTION |
| 0-1 | ID | 0-15 | Loop identification (5 digits, 00000-59999) 1st digit = 0-5 for area identification 2nd digit = Furnace no., channel no., etc. 3rd digit = Loop function character (usually 5 = E for electrode monitoring loops) 4th & 5th digits = Sequential number within an area/type |
| 2 | POCNUM | 0-3 | Process Operator's Console number (1-15, 0 if none) |
| | | 4-7 | Subhost number (normally 1-15, o if no Subhost) |
| 3 | FACEP | 0-4 | Face panel (Condenser) number (1-31) |
| | | 5-7 | Spare |
| 4 | RKCTL | 0-3 | Rack number (1-12) |
| | | 4-7 | Controller number within the rack (-19) |
| 5 | INSUB | 0-2 | Spare |
| | | 3-7 | Input subroutine (16 for electrode monitoring) |
| 6 | AINPT | 0-3 | Spare |
| | | 4-7 | Analog input multiplexer specification 0 = Not multiplexer input 1-8 = Multiplexer input point number |
| 7 | MUXTIM | 0-7 | Settle time (number of scans between readings) |
| 8-9 | RAWD | 0-15 | Raw data reading  *S |
| 10-11 $0A-0B | ELSCAN | 0-15 | Address in Controller of point being multiplexed  *S |
| 12-15 $0C-$0F | MINVLT | *FP | Minimum allowed voltage |
| 16-19 $10-$13 | MINAMP | *FP | Minimum allowed current |
| 20-531 $14-$213 | CONAV | *FP | Voltage range for n-th electrode pair |
| | CONAI | *FP | Current range for n-th electrode pair |
| | RSETPT | *FP | Resistance setpoint for n-th electrode pair |
| | RDEV | *FP | Resistance deviation limit for n-th electrode pair |

| Electrode | CONAV(n) | | CONAI(n) | | RSETPT(n) | | RDEV(n) | |
|---|---|---|---|---|---|---|---|---|
| 1 | 20 | $14 | 24 | $18 | 28 | $1C | 32 | $20 |
| 2 | 36 | $24 | 40 | $28 | 44 | $2C | 48 | $30 |
| 3 | 52 | $34 | 56 | $38 | 60 | $3C | 64 | $40 |
| 4 | 68 | $44 | 72 | $48 | 76 | $4C | 80 | $50 |
| 5 | 84 | $54 | 88 | $58 | 92 | $5C | 96 | $60 |
| 6 | 100 | $64 | 104 | $68 | 108 | $6C | 112 | $70 |
| 7 | 116 | $74 | 120 | $78 | 124 | $7C | 128 | $80 |
| 8 | 132 | $84 | 136 | $88 | 140 | $8C | 144 | $90 |
| 9 | 148 | $94 | 152 | $98 | 156 | $9C | 160 | $A0 |
| 10 | 164 | $A4 | 168 | $A8 | 172 | $AC | 176 | $B0 |
| 11 | 180 | $B4 | 184 | $B8 | 188 | $BC | 192 | $C0 |
| 12 | 196 | $C4 | 200 | $C8 | 204 | $CC | 208 | $D0 |
| 13 | 212 | $D4 | 216 | $D8 | 220 | $DC | 224 | $E0 |
| 14 | 228 | $E4 | 232 | $E8 | 236 | $EC | 240 | $F0 |
| 15 | 244 | $F4 | 248 | $F8 | 252 | $FC | 256 | $100 |
| 16 | 260 | $104 | 264 | $108 | 268 | $10C | 272 | $110 |
| 17 | 276 | $114 | 280 | $118 | 284 | $11C | 288 | $120 |
| 18 | 292 | $124 | 296 | $128 | 300 | $12C | 304 | $130 |
| 19 | 308 | $134 | 312 | $138 | 316 | $13C | 320 | $140 |
| 20 | 324 | $144 | 328 | $148 | 332 | $14C | 336 | $150 |
| 21 | 340 | $154 | 344 | $158 | 348 | $15C | 352 | $160 |
| 22 | 356 | $164 | 360 | $168 | 364 | $16C | 368 | $170 |

TABLE III-continued
DESCRIPTION OF PRIMARY PART OF ELECTRODE MONITORING LOOP

| | | | | | | | |
|---|---|---|---|---|---|---|---|
| 23 | 372 | $174 | 376 | $178 | 380 | $17C | 384 | $180 |
| 24 | 388 | $184 | 392 | $188 | 396 | $18C | 400 | $190 |
| 25 | 404 | $194 | 408 | $198 | 412 | $19C | 416 | $1A0 |
| 26 | 420 | $1A4 | 424 | $1A8 | 428 | $1AC | 432 | $1B0 |
| 27 | 436 | $1B4 | 440 | $1B8 | 444 | $1BC | 448 | $1C0 |
| 28 | 452 | $1C4 | 456 | $1C8 | 460 | $1CC | 464 | $1D0 |
| 29 | 468 | $1D4 | 472 | $1D8 | 476 | $1DC | 480 | $1E0 |
| 30 | 484 | $1E4 | 488 | $1E8 | 492 | $1EC | 496 | $1F0 |
| 31 | 500 | $1F4 | 504 | $1F8 | 508 | $1FC | 512 | $200 |
| 32 | 516 | $204 | 520 | $208 | 524 | $20C | 528 | $210 |

TABLE III
DESCRIPTION OF VARIABLE PART OF ELECTRODE MONITORING LOOP

| BYTE | BYTE NAME | BIT | DESCRIPTION | |
|---|---|---|---|---|
| 532-1043 $214-$413 | ELEPNT | 0-1 | Scan control bits for n-th electrode pair<br>0 = Electrode does not exist on this furnace<br>1 = Electrode exists, but is not on scan<br>3 = Electrode exists and is being scanned | |
| | | 2 | Spare | |
| | | 3-7 | Input multiplexer (0-31) for n-th electrode pair | |
| | ELEALM | 0-3 | Spare | |
| | | 4 | Voltage alarm indicator for n-th electrode pair | *S |
| | | 5 | Current alarm indicator for n-th electrode pair | *S |
| | | 6 | Resistance high alarm for n-th electrode pair | *S |
| | | 7 | Resistance low alarm for n-th electrode pair | *S |
| | | 8-23 | Spare | |
| | VOLTR | *FP | Voltage reading for n-th electrode pair | *S |
| | AMPR | *FP | Current reading for n-th electrode pair | *S |
| | RESIS | *FP | Resistance calculated for n-th electrode pair | *S |

| Electrode | ELEPNT(n) | | ELEALM(n) | | VOLTR(n) | | AMPR(n) | | RESIS(n) | |
|---|---|---|---|---|---|---|---|---|---|---|
| 1 | 532 | $214 | 533 | $215 | 536 | $218 | 540 | $21C | 544 | $220 |
| 2 | 548 | $224 | 549 | $225 | 552 | $228 | 556 | $22C | 560 | $230 |
| 3 | 564 | $234 | 565 | $235 | 568 | $238 | 572 | $23C | 576 | $240 |
| 4 | 580 | $244 | 581 | $245 | 584 | $248 | 588 | $24C | 592 | $250 |
| 5 | 596 | $254 | 597 | $255 | 600 | $258 | 604 | $25C | 608 | $260 |
| 6 | 612 | $264 | 613 | $265 | 616 | $268 | 620 | $26C | 624 | $270 |
| 7 | 628 | $274 | 629 | $275 | 632 | $278 | 636 | $27C | 640 | $280 |
| 8 | 644 | $284 | 645 | $285 | 648 | $288 | 652 | $28C | 656 | $290 |
| 9 | 660 | $294 | 661 | $295 | 664 | $298 | 668 | $29C | 672 | $2A0 |
| 10 | 676 | $2A4 | 677 | $2A5 | 680 | $2A8 | 684 | $2AC | 688 | $2B0 |
| 11 | 692 | $2B4 | 693 | $2B5 | 696 | $2B8 | 700 | $2BC | 704 | $2C0 |
| 12 | 708 | $2C4 | 709 | $2C5 | 712 | $2C8 | 716 | $2CC | 720 | $2D0 |
| 13 | 724 | $2D4 | 725 | $2D5 | 728 | $2D8 | 732 | $2DC | 736 | $2E0 |
| 14 | 740 | $2E4 | 741 | $2E5 | 744 | $2E8 | 748 | $2EC | 752 | $2F0 |
| 15 | 756 | $2F4 | 757 | $2F5 | 760 | $2F8 | 764 | $2FC | 768 | $300 |
| 16 | 772 | $304 | 773 | $305 | 776 | $308 | 780 | $30C | 784 | $310 |
| 17 | 788 | $314 | 789 | $315 | 792 | $318 | 796 | $31C | 800 | $320 |
| 18 | 804 | $324 | 805 | $325 | 808 | $328 | 812 | $32C | 816 | $330 |
| 19 | 820 | $334 | 821 | $335 | 824 | $338 | 828 | $33C | 832 | $340 |
| 20 | 836 | $344 | 837 | $345 | 840 | $348 | 844 | $34C | 848 | $350 |
| 21 | 852 | $354 | 853 | $355 | 856 | $358 | 860 | $35C | 864 | $360 |
| 22 | 868 | $364 | 869 | $365 | 872 | $368 | 876 | $36C | 880 | $370 |
| 23 | 884 | $374 | 885 | $375 | 888 | $378 | 892 | $37C | 896 | $380 |
| 24 | 900 | $384 | 901 | $385 | 904 | $388 | 908 | $38C | 912 | $390 |
| 25 | 916 | $394 | 917 | $395 | 920 | $398 | 924 | $39C | 928 | $3A0 |
| 26 | 932 | $3A4 | 933 | $3A5 | 936 | $3A8 | 940 | $3AC | 944 | $3B0 |
| 27 | 948 | $3B4 | 949 | $3B5 | 952 | $3B8 | 956 | $3BC | 960 | $3C0 |
| 28 | 964 | $3C4 | 965 | $3C5 | 968 | $3C8 | 972 | $3CC | 976 | $3D0 |
| 29 | 980 | $3D4 | 981 | $3D5 | 984 | $3D8 | 988 | $3DC | 992 | $3E0 |
| 30 | 996 | $3E4 | 997 | $3E5 | 1000 | $3E8 | 1004 | $3EC | 1008 | $3F0 |
| 31 | 1012 | $3F4 | 1013 | $3F5 | 1016 | $3F8 | 1020 | $3FC | 1024 | $400 |
| 32 | 1028 | $404 | 1029 | $405 | 1032 | $408 | 1036 | $40C | 1040 | $410 |

| 1044-1047 | ELMWRD | 0-26 | Spare |

TABLE III-continued
DESCRIPTION OF VARIABLE PART OF ELECTRODE MONITORING LOOP

| | | | |
|---|---|---|---|
| $414–$417 | 27–29 | Controller communications error status<br>Bit 27 = 1 if no response from Controller<br>Bit 28 = 1 if protocol error detected<br>Bit 29 = 1 if command reject response from Controller | *S |
| | 30–31 | Spare | |

Electrode Monitoring Loop - Condenser/Subhost

In addition to the 1048 bytes of information contained in the controller electrode monitoring loop, the condenser has additional information stored in its concerning the electrode monitoring loop. This additional information is stored in bytes 1048 through bytes 1199. The same information is stored in the subhost. This portion of the electrode monitoring lop gives the condenser or the subhost the ability to initiate specific communications to reload or delete specific electrode monitoring loops form the system.

TABLE IV
DESCRIPTION OF CONDENSER LOCAL PART OF ELECTRODE MONITORING LOOP

| BYTE | BYTE NAME | BIT | DESCRIPTION |
|---|---|---|---|
| 1048<br>$418 | EMFLAG | 0 | Delete loop command needs to be sent to controller. |
| | | 1 | Delete loop command has sent to controller, but logging report has not been sent to subhost. |
| | | 2–4 | New loop (or controller needs reloaded) indicators<br>0 = Not a new loop and controller not reloaded<br>1 = Entire loop data for a new loop has been sent to load the appropriate controller and needs to be reported to the subhost.<br>2 = Entire loop data has been sent to reload a controller and this reloading needs to be reported to the subhost.<br>5 = This is a new loop which needs to be sent to the appropriate controller. After the loop has been loaded, a report should be sent to the subhost.<br>6 = The controller responsible for this loop has requested a reloading of its loops. After this loop has been reloaded, a report should be sent to the subhost. |
| | | 5 | Some change in the loop data has been successfully sent to the appropriate controller and now needs to be reported to the subhost. This bit is a logical OR of all the bits in the ESFLAG array. |
| | | 6 | Spare |
| | | 7 | Some change in the loop data needs to be sent to the appropriate controller. This bit is a logical OR of all the bits in the ENFLAG array. |
| 1049–1081<br>$419–$439 | ENFLAG | all | Each bit corresponds to a block of 4 bytes in the loop record, counting sequentially from the ID byte up to the start of the condenser local area. A bit set means that one or more bytes in the block has (have) been changed, and that the changed block has not yet been sent to the controller. Since no cascading is allowed with electrode monitoring loops, the change had to have come from either the local condenser keyboard or the POC connected to the subhost.<br>After the change has been sent to the controller, it should be reported to the subhost for logging; i.e., as bits in ENFLAG are cleared, the corresponding bits in ESFLAG should be set. |
| 1082–1114<br>$43A–$45A | ESFLAG | all | Each bit corresponds to a block of 4 bytes in the loop record, counting sequentially from the ID byte up to the start of the condenser local area. A bit set means that one or more bytes in the block has (have) been changed, and the change should now be reported to the subhost for logging. The change may have been from a keyboard entry which has been successfully sent to the controller. It may also have been an alarm status change detected by the controller and sent to the condenser. |
| 1115–1199<br>$45B–$49B | Spare | | |

Condenser Master Loop

In addition to being able to communicate with the controllers, the condenser also is the input device for the isothermal block inputs from the field isothermal devices. A master loop is provided within the condenser to be able to read this information, store it and get it to the proper controller. A master loop is provided in the condenser to handle this manipulation of the information. This is in bytes 0 through 167 in the condenser master loop. The specific information and the order of storing this information is given in Table V.

TABLE V
DESCRIPTION OF PRIMARY PART OF CONDENSER MASTER LOOP

| BYTE | BYTE NAME | BIT | DESCRIPTION | |
|---|---|---|---|---|
| 0–1 | CDRLP | 0–15 | Loop identification (5 digits, 60901–60931) 1st digit = 6 (value reserved for required loop) 2nd digit = 0 (identifies condenser master loop) 3rd digit = Loop function character (9 = S for required system loop) 4th & 5th digits = Condenser ID number (1–31) | |
| 2 | SBHOST | 0–3 | Process Operator's Console number (1–15, 0 if none) | |
| | | 4–7 | Subhost number (normally 1–15, 0 if no Subhost) | |
| 3 | NLOOPS | 0–7 | Number of controller loops in this Condenser | *S |
| 4 | NLALRM | 0–7 | Number of controller loops in an alarm condition in this Condenser | *S |
| 5–6 | COMERR | 0–15 | Number of soft controller communications errors | *S |
| 7 | CDRNUM | 0–7 | Condenser ID number (1–31) | |
| 8 | CDRELM | 0–7 | Indicates electrode monitoring loops allowed 0 = No electrode monitoring in this condenser +−= Electrode monitoring (0–3 loops) can be placed in this condenser | |
| 9 | PASSWD | 0–7 | Indicates current password level 0 = Keyboard entry locked (display only mode) − = Operator entry allowed + = Engineer entry allowed | |
| 10–15 $0A–$0F | PASSWE | all | Keyboard character string to unlock engineer's level | |
| 16–21 $10–$15 | PASSWO | all | Keyboard character string to unlock operator's level | |
| 22 $16 | ISONUM | 0–7 | Number of isothermal blocks to be read (0–7) | |
| 23–24 $17–$18 | CALARM | 0 | Analog output power supply fault | *S |
| | | 1 | Analog input power supply fault | *S |
| | | 2 | Multiplexer power supply fault | *S |
| | | 3 | Watchdog timer fault | *S |
| | | 4 | Bubble memory fault | *S |
| | | 5 | Spare (reserved for another fault condition) | |
| | | 6 | No response from ADC reading isothermal block(s) | *S |
| | | 7 | No communication from subhost | *S |
| | | 8 | Keyboard entry has changed the value of ISONUM (reset when the new value is sent to subhost) | *S |
| | | 9 | Keyboard entry has changed value of ISOLOL (reset when the new value is sent to subhost) | *S |
| | | 10 | Keyboard entry has changed the value of ISOHIL (reset when the new value is sent to subhost) | *S |
| | | 11 | Keyboard entry has changed the value of ISOCHL (reset when the new value is sent to subhost) | *S |
| | | 12 | Keyboard entry has changed the password values (reset when the new values sent to subhost) | *S |
| | | 13 | Condenser has been reloaded from Controllers (reset when this word is sent to subhost) | *S |
| | | 14 | New value in some isothermal status byte (logical OR of all new status bits in the CLDALM array) | *S |
| | | 15 | New alarm status in bits 0–7 of this word (reset when this word | *S |

TABLE V-continued
DESCRIPTION OF PRIMARY PART OF CONDENSER MASTER LOOP

| BYTE | BYTE NAME | BIT | DESCRIPTION | |
|---|---|---|---|---|
| | | | is sent to subhost) | |
| 25 $19 | CLDALM | 0 | Isothermal block 1 polarity error | *S |
| | | 1 | Isothermal block 1 ADC overrange error | *S |
| | | 2 | Isothermal block 1 input high error | *S |
| | | 3 | Isothermal block 1 input low error | *S |
| | | 4 | Isothermal block 1 input rate of change error | *S |
| | | 5 | Spare | |
| | | 6 | Isothermal block 1 calibration has been changed (reset when calibration is sent to subhost) | *S |
| | | 7 | New alarm status in bits 0–4 of this byte (reset when this byte is sent to subhost) | *S |
| 26 $1A | | 0 | Isothermal block 2 polarity error | *S |
| | | 1 | Isothermal block 2 ADC overrange error | *S |
| | | 2 | Isothermal block 2 input high error | *S |
| | | 3 | Isothermal block 2 input low error | *S |
| | | 4 | Isothermal block 2 input rate of change error | *S |
| | | 5 | Spare | |
| | | 6 | Isothermal block 2 calibration has been changed (reset when calibration is sent to subhost) | *S |
| | | 7 | New alarm status in bits 0–4 of this byte (reset when this byte is sent to subhost) | *S |
| 27 $1B | | 0 | Isothermal block 3 polarity error | *S |
| | | 1 | Isothermal block 3 ADC overrange error | *S |
| | | 2 | Isothermal block 3 input high error | *S |
| | | 3 | Isothermal block 3 input low error | *S |
| | | 4 | Isothermal block 3 input rate of change error | *S |
| | | 5 | Spare | |
| | | 6 | Isothermal block 3 calibration has been changed (reset when calibration is sent to subhost) | *S |
| | | 7 | New alarm status in bits 0–4 of this byte (reset when this byte is sent to subhost) | *S |
| 28 $1C | | 0 | Isothermal block 4 polarity error | *S |
| | | 1 | Isothermal block 4 ADC overrange error | *S |
| | | 2 | Isothermal block 4 input high error | *S |
| | | 3 | Isothermal block 4 input low error | *S |
| | | 4 | Isothermal block 4 input rate of change error | *S |
| | | 5 | Spare | |
| | | 6 | Isothermal block 4 calibration has been changed (reset when calibration is sent to subhost) | *S |
| | | 7 | New alarm status in bits 0–4 of this byte (reset when this byte is sent to subhost) | *S |
| 29 $1D | | 0 | Isothermal block 5 polarity error | *S |
| | | 1 | Isothermal block 5 ADC overrange error | *S |
| | | 2 | Isothermal block 5 input high error | *S |
| | | 3 | Isothermal block 5 input low error | *S |
| | | 4 | Isothermal block 5 input rate of change error | *S |
| | | 5 | Spare | |

TABLE V-continued
DESCRIPTION OF PRIMARY PART OF CONDENSER MASTER LOOP

| BYTE | BYTE NAME | BIT | DESCRIPTION | |
|---|---|---|---|---|
| | | 6 | Isothermal block 5 calibration has been changed (reset when calibration is sent to subhost) | *S |
| | | 7 | New alarm status in bits 0-4 of this byte (reset when this byte is sent to subhost) | *S |
| 30 $1E | | 0 | Isothermal block 6 polarity error | *S |
| | | 1 | Isothermal block 6 ADC overrange error | *S |
| | | 2 | Isothermal block 6 input high error | *S |
| | | 3 | Isothermal block 6 input low error | *S |
| | | 4 | Isothermal block 6 input rate of change error | *S |
| | | 5 | Spare | |
| | | 6 | Isothermal block 6 calibration has been changed (reset when calibration is sent to subhost) | *S |
| | | 7 | New alarm status in bits 0-4 of this byte (reset when this byte is sent to subhost) | *S |
| 31 $1F | | 0 | Isothermal block 7 polarity error | *S |
| | | 1 | Isothermal block 7 ADC overrange error | *S |
| | | 2 | Isothermal block 7 input high error | *S |
| | | 3 | Isothermal block 7 input low error | *S |
| | | 4 | Isothermal block 7 input rate of change error | *S |
| | | 5 | Spare | |
| | | 6 | Isothermal block 7 calibration has been changed (reset when calibration is sent to subhost) | *S |
| | | 7 | New alarm status in bits 0-4 of this byte (reset when this byte is sent to subhost) | *S |
| 32 $20 | BOFSET | | Bubble memory page offset for process loop table (Zero when sent from subhost) | |
| 33-47 $21-$2F | | | Spare | |
| 48-51 $30-$33 | ISOLOL | *FP | Isothermal block input temperature reading lower limit (degrees Fahrenheit) | |
| 52-55 $34-$37 | ISOHIL | *FP | Isothermal block input temperature reading upper limit (degrees Fahrenheit) | |
| 56-59 $38-$3B | ISOCHL | *FP | Isothermal block input temperature reading change limit (Fahrenheit degrees/second) | |
| 60-63 $3C-$3F | ISOCAL | *FP | Calibration for isothermal block 1 sensor (degrees Fahrenheit per 0.0001 volts), nominally 0.159 | |
| 64-67 $40-$43 | | *FP | Calibration for isothermal block 2 sensor (degrees Fahrenheit per 0.0001 volts), nominally 0.159 | |
| 68-71 $44-$47 | | *FP | Calibration for isothermal block 3 sensor (degrees Fahrenheit per 0.0001 volts), nominally 0.159 | |
| 72-75 $48-$4B | | *FP | Calibration for isothermal block 4 sensor (degrees Fahrenheit per 0.0001 volts), nominally 0.159 | |
| 76-79 $4C-$4F | | *FP | Calibration for isothermal block 5 sensor (degrees Fahrenheit per 0.0001 volts), nominally 0.159 | |
| 80-83 $50-$53 | | *FP | Calibration for isothermal block 6 sensor (degrees Fahrenheit per 0.0001 volts), nominally 0.159 | |
| 84-87 $54-$57 | | *FP | Calibration for isothermal block 7 sensor (degrees Fahrenheit per 0.0001 volts), nominally 0.159 | |
| 88-91 $58-$5B | ISOTMP | *FP | Raw Temperature reading (may be invalid) from isothermal block 1 (degrees Fahrenheit) | *S |
| 92-95 $5C-$5F | | *FP | Raw Temperature reading (may be invalid) from isothermal block 2 | *S |

TABLE V-continued
DESCRIPTION OF PRIMARY PART OF CONDENSER MASTER LOOP

| BYTE | BYTE NAME | BIT | DESCRIPTION | |
|---|---|---|---|---|
| | | | (degrees Fahrenheit) | |
| 96–99<br>$60–$63 | | *FP | Raw Temperature reading (may be invalid) from isothermal block 3 (degrees Fahrenheit) | *S |
| 100–103<br>$64–$67 | | *FP | Raw Temperature reading (may be invalid) from isothermal block 4 (degrees Fahrenheit) | *S |
| 104–107<br>$68–$6B | | *FP | Raw Temperature reading (may be invalid) from isothermal block 5 (degrees Fahrenheit) | *S |
| 108–111<br>$6C–$6F | | *FP | Raw Temperature reading (may be invalid) from isothermal block 6 (degrees Fahrenheit) | *S |
| 112–115<br>$70–$73 | | *FP | Raw Temperature reading (may be invalid) from isothermal block 7 (degrees Fahrenheit) | *S |
| 116–119<br>$74–$77 | CLDTBL | *FP | Temperature for cold junction compensation of thermocouples on isothermal block 1 (deg F.) | *S |
| 120–123<br>$78–$7B | | *FP | Temperature for cold junction compensation of thermocouples on isothermal block 2 (deg F.) | *S |
| 124–127<br>$7C–$7F | | *FP | Temperature for cold junction compensation of thermocouples on isothermal block 3 (deg F.) | *S |
| 128–131<br>$80–$83 | | *FP | Temperature for cold junction compensation of thermocouples on isothermal block 4 (deg F.) | *S |
| 132–135<br>$84–$87 | | *FP | Temperature for cold junction compensation of thermocouples on isothermal block 5 (deg F.) | *S |
| 136–139<br>$88–$8B | | *FP | Temperature for cold junction compensation of thermocouples on isothermal block 6 (deg F.) | *S |
| 140–143<br>$8C–$8F | | *FP | Temperature for cold junction compensation of thermocouples on isothermal block 7 (deg F.) | *S |
| 144–167<br>$99–$A7 | | | Spare | |

Input Subroutines

Since the controller can handle any type of field information such as pressure, temperature, flow, several different subroutines are needed to condition the input information into a format which can be handled by the controller. These input subroutines are imbedded in the standard loop record on bits 3 through 7 of byte 5 of the loop records. Table VI gives not only the information and number which needs to be in these bits, but also gives an explanation of the purpose and the action taken by the subroutines.

TABLE VI
INPUT SUBROUTINES
Bits 3–7 of Byte 5 of Loop Records

| INSUB | DESCRIPTION |
|---|---|
| 0 | = No input subroutine |
| 1 | = Input from MEAS of loop in INMAD |
| 2 | = Input from OUTPT of loop in INMAD |
| 3 | = Input from SETPT of loop in INMAD |
| 4 | = Input scaling without bad input check |
| 5 | = Input scaling with bad input check |
| 6 | = Thermocouple input |
| 7 | = Orifice plate flow with zero check |
| 8 | = Oxygen probe (temperature loop ID in INMAD, millivolt loop ID in INMAD 2) |
| 9 | = Ratio (MEAS of INMAD)/(MEAS of OUTAD) |
| 10 | = Spare |
| 11 | = Orifice plate flow without zero check |
| 12–15 | = Spare |
| 16 | = Electrode resistance monitoring |
| 17–31 | = Spare |

TABLE VI-continued
INPUT SUBROUTINES

Input Subroutine 1 - Input from MEAS of Loop in INMAD
Purpose: Transfers the measured value of one loop into the measured value of another loop.
Action: Takes the floating point process variable in bytes 112-115 (MEAS) of the standard loop defined in bytes 32-33 (INMAD) and places it in bytes 112-115 (MEAS) of current loop.

Input Subroutine 2 - Input from OUTPT of Loop in INMAD
Purpose: Transfers the output value of one loop into the measured value of another loop.
Action: Takes the floating point output variable in bytes 120-123 (OUTPT) of the standard loop defined in bytes 32-33 (INMAD) and places it in bytes 112-115 (MEAS) of current loop.

Input Subroutine 3 - Input from SETPT of Loop in INMAD
Purpose: Transfers the setpoint value of one loop into the measured value of another loop.
Action: Takes the floating point setpoint variable in bytes 116-119 (SETPT) of the standard loop defined in bytes 32-33 (INMAD) and places it in bytes 112-115 (MEAS) of current loop.

Input Subroutine 4 - Input Scaling Without Bad Input Check
Purpose: Converts 2 to 10 volt input signal to 0 to 32,767 computer units.
Action: Removes 2 volts from reading and linearly scales remaining voltage to 0 to 32,767 computer units and places this value in bytes 112-115 (MEAS) of current loop.

Input Subroutine 5 - Input Scaling With Bad Input Check
Purpose: Checks input signal for signal error and converts 2 to 10 volts input signal to 0 to 32,767 computer units.
Action: Checks for at least 2 volts input. If 2 volts or greater, the bad input counter, bits 0 and 1 of byte

TABLE VI-continued
INPUT SUBROUTINES 16 (INBAD) is reset. If less than 2 volts, the input bad counter is incremented, bit 2 of byte 16 (INBAD) and this loop is bypassed. Once the input is bad, three times in succession, the loop is forced to manual. Otherwise, 2 volts is removed from the input and the remaining voltage is linearly scaled to 0 to 32,767 computer units and placed in bytes 112-115 (MEAS) of current loop.

Input Subroutine 6 - Thermocouples
Purpose: Curve fit, cold junction or remote compensation, and break check.
Action: Table look up of the temperature per millivolt input signal.
The following are choices that can be entered through the condenser
Define the type of thermocouple from bits 0-2 of byte 29 (THERM) in this standard loop
1 - J - Iron Constantan
2 - K - Chromel Alumel
3 - R - Platinum - Platinum/13% Rhodium
4 - B - Platinum 6%/Platinum 30%
5 - C - Tungsten 5% Rhenium/Tungsten 26% Rhenium
Define change check (open thermocouple) from bit 3 of byte 29 (THERM) in this standard loop
If the thermocouple reading changes by more than the limit chosen below, the loop will force itself on manual
0 - No check change - no action on input changes
1 - Change check selected
Change check limit (if change check chosen above) from bits 4-5 of byte 29 (THERM) in this standard loop
0 - 1% of full range
1 - 5% of full range
2 - 10% of full range
3 - 50% of full range
Cold junction or remote compensation from bits 0-3 of byte 30 (TMCOM) in this standard loop
0 - Remote compensation
A millivolt signal equivalent to the below temperatures for a type r thermocouple is added to the controller reading for temperature calc.
0 - Type R 32 degrees
1 - Type R 150 degrees
3 - Type R 200 degrees
1 - Cold junction comp. - This selection will add a millivolt signal to the controller reading.
This compensation temperature is read at the condenser isothermo block.
Information is stored in bytes 112-115 (MEAS) of current loop

Input Subroutine 7 - Orifice Plate Flow With Zero Check
Purpose: This routine checks 2 to 10 volt signal from orifice flow device for signal error, subtracts 2 volts offset, takes square root of remaining signal and scales this value linearly into 0 to 32,767 computer units.
Action: Checks for at least 2 volts input from orifice flow device. If 2 volts or greater the bad input counter, bits 0 and 1 of byte 16 (INBAD) is reset. If less than 2 volts, the input bad counter, bit 2 of byte 16 (INBAD) is incremented and this loop is bypassed. Once the input is bad, three times in succession, the loop is forced to manual. Otherwise, 2 volts is removed from the input and the square root is taken of the remaining voltage. This square root value is linearly scaled to 0 to 32,767 computer units and placed in bytes 112-115 (MEAS) of current loop.

Input Subroutine 8 - Oxygen Probe
Purpose: Calculates percent oxygen present by taking raw measurement from oxygen probe and correcting for temperature.
Action: Reads bytes 112-115 (MEAS) from loop identified in bytes 34-35 (INMAD 2) as raw oxygen measurement in 2 to 10 volt signal. Reads bytes 112-115 (MEAS) from loop identified in bytes 32-33 (INMAD) as temperature measurement. Calculates oxygen measurement S = f(oxygen meas) x f(temperature). Converts signal S to 0 to 32,757 computer units and places this value in bytes 112-115 (MEAS) of current loop.

Input Subroutine 9 - Ratio (MEAS of INMAD)/(MEAS of OUTAD)
Purpose: Provide a readout of the actual ratio being maintained by ratio control elements.
Action: Reads input from bytes 112-115 (MEAS) of standard loop defined in bytes 32-33 (INMAD), divides this value by output from bytes 26-27 (OUTAD) of current loop and scales the results to 0 to 32,757 computer units and places this value to bytes 112-115 (MEAS) of current loop.

Input Subroutine 11 - Orifice Plate Flow Without Zero Check
Purpose: This routine takes square root of 2 to 10 volt signal from orifice flow device and scales this value linearly into computer units.
Action: This routine takes 2 to 10 volt signal from orifice flow device, takes square root of reading, linearly scales square root reading into 0 to 32,757 computer units and places this value in bytes 112-115 (MEAS) of current loop.

Input Subroutine 16 - Electrode Resistance Calculation and Error Processing
Purpose: This routine will read the voltage and amperage of each of a possible 32 electrodes. The minimum and maximum voltage and amperage permitted are checked and will alarm if out of limits. The ohms is checked against the deviation permitted on this electrode. If the resistance is high or low and was not the last time scanned, the high or low out of limits alarm is set and the high or low message printed. The annunciator is turned on when an electrode goes into alarm regardless of the condition of the annunciator (one might already be in alarm). The front Led display will provide a flashing element number on the bar graph left and right displays. EX. if element 23 is in alarm, the left display will display 20 and the right display 30. The controller will scan the electrode pairs at a rate entered on the condenser loop setup.
Action: Specific locations for voltage readings (VOLTR), ampere readings (AMPR) and resistance calculations (RESIS) are given in electrode monitoring loop write up.

Algorithms

Because of the diversity of information being fed to the controllers and the diversity of the type of control which is needed for different types of input, a number of algorithms are available within each controller. The standard loop record contains the choice for algorithms on bits 0 through 4 of byte 7. These algorithms are listed in Table VII including the type of control, the action taken and whatever calculation is necessary to perform the algorithm.

TABLE VII
ALGORITHMS

| ALGORITHM OPTIONS | DESCRIPTION |
|---|---|
| 0 | Spare |
| 1 | Integral control |
| 2 | Integral and proportional control |

TABLE VII-continued
ALGORITHMS

| | | |
|---|---|---|
| | 3 | Integral, proportional and non-linear control |
| | 4 | Integral, proportional, non-linear and input derivative control |
| | 5 | Average a number of process variable |
| | 7–9 | Spares |
| | 10 | Ratio control |
| | 11–15 | Spares |
| | 16 | Integral, proportional, non-linear and error derivative control |
| | 17 | Timed pulse duration |
| | 18–31 | Spares |

Algorithm 1 - Integral Control

Purpose: Control
Action:
1. Input bad alarm
2. Input high/low alarm
3. Error high/low alarm
4. Output high/low alarm Calculation:

Output = Σ(KP)(KI)(E) + B
KP = Proportional Gain
KI = Reset Rate, Repeats/Minute
E = Error
B = Bias

Algorithm 2 - Integral and Proportional Control

Purpose: Control
Action:
1. Input bad alarm
2. Input high/low alarm
3. Error high/low alarm
4. Output high/low alarm Calculation:

Output (KP)(E) + Σ(KP)(KI)(E) + B
KP = Proportional Gain
KI = Reset Rate, Repeats/Minute
E = Error
B = Bias

Algorithm 3 - Integral, Proportional and Non-Linear Control

Purpose: Control
Action:
1. Input bad alarm
2. Input high/low alarm
3. Error high/low alarm
4. Output high/low alarm Calculation:

Output = (KP)(E)[1+(KNL)(F)]+Σ(KP)(KI)(E)[1+(KNL)(F)]+B
KP = Proportional Gain
KI = Reset Rate, Repeats/Minute
E = Error
B = Bias
F = Absolute Value of Error
KNL = Non-Linear Gain

Algorithm 4 - Integral, Proportional, Non-Linear and Input Derivative Control Purpose: Control
Action:
1. Input bad alarm
2. Input high/low alarm
3. Error high/low alarm
4. Output high/low alarm Calculation:

Output = (KP)(E)[1+(KNL)(F)]+Σ(KP)(KI)(E)[1+(KNL)(F)]+DN+B
where: DN = (KP)(KD)(KI) + (1-KDC)(D)
and
DN = Amount of derivative input action this time
D = Amount of derivative input action last time
KD = Derivative gain
KDC = Derivative rate, decays/scan time
KP = Proportional Gain
KI = Reset Rate, Repeats/Minute
E = Error
B = Bias
F = Absolute Value of Error
KNL = Non-Linear Gain

Algorithm 5 - Average a Number of Process Variables

Purpose: Average the inputs or outputs of a number of loops. Each loop's data will have a weight associated with it. The results of averaging will be placed in the averaging loop's output.
Action:
1. Input bad alarm
2. Input high/low alarm
3. Error high/low alarm

TABLE VII-continued
ALGORITHMS

| | |
|---|---|
| Calculation: | 4. Output high/low alarm |

$$\text{Output} = \frac{(\text{Loop1})(\text{Weight}) + \ldots + (\text{LoopN})(\text{WeightN})}{(\text{Sum of Weights})}$$

Algorithm 10 - Ratio Control

| | |
|---|---|
| Purpose: | Ratio control - input is actual ratio of elements. |
| Action | 1. Input bad alarm |
| | 2. Input high/low alarm |
| | 3. Error high/low alarm |
| | 4. Output high/low alarm |
| Calculation: | Output = 2(S)(I)(Bias) + M |
| | S = Ratio Setpoint |
| | I = Input |
| | Bias = Output bias |
| | M = Miscalibration Factor (default value = 0) |

Algorithm 16 - Integral, Proportional, Non-Linear and Error Derivative Control

| | |
|---|---|
| Purpose: | Control |
| Action: | 1. Input bad alarm |
| | 2. Input high/low alarm |
| | 3. Error high/low alarm |
| | 4. Output high/low alarm |
| Calculation: | Output = (KP)(E)[1+(KNL)(F)]+Σ(KP)(KI)(E)[1+(KNL)(F)]+DE+B |
| where: | DE = (KP)(KD)(KI) + (1-KDC)(D) |
| and | DE = Amount of derivative input action this time |
| | D = Amount of derivative input action last time |
| | KD = Derivative gain |
| | KDC = Derivative rate, decays/scan time |
| | KP = Proportional Gain |
| | KI = Reset Rate, Repeats/Minute |
| | E = Error |
| | B = Bias |
| | F = Absolute Value of Error |
| | KNL = Non-Linear Gain |

Algorithm 17 - Pulsed and Timed Duration Output

| | |
|---|---|
| Purpose: | Provide the means to use digital output in waveform or pulse length mode. |
| Action: | 1. Input bad alarm |
| | 2. Input high/low alarm |
| | 3. Error high/low alarm |
| | 4. Output = + or − pulse on digital output bit, when deviation limit exceeded |
| Usage: | During power control, it is desirable to have the power measurement to be within a certain deviation limit from the setpoint. The amount of power is controlled by an automatic transformer tap changer. The tap changer requires a level input for a specified time period for the mechanics of the system to operate. Two inputs are required; one for a positive tap change (increase power), and one for a negative tap change (decrease power). The controller uses its 8 digital output bits to provide these pulses to the tap changer. Which digital output bit pairs (+ and −) to use are selectable through the condenser face panel. A 1 entered will use bits 0 and 1 for output pulses, a 2 will use bits 2 and 3 for output pulses, a 3 will use bits 4 and 5. Bits 6 and 7 cannot be used because these are saved for alarming action on other types of loops. Bits 0 and 1 should only be used if the controller has only one input loop assigned to it. If the controller has two input loops assigned to it, bits 0 and 1 are needed to multiplex inputs. The pulsed loop deviation limit is the window for control to occur. If the measurement is lower than the setpoint by an amount equal to or greater than the deviation limit, the controller will send out a pulse to increase the tap position. The pulse length is selectable through the condenser loop setup. After the tap has changed, the controller delays any further control action until the settle time (set during loop setup) is expired. This settle time must be longer than the pulse time. The difference between the pulse time and settle time is the actual delay before the next control action is taken. The controller will also take the above |

TABLE VII-continued
ALGORITHMS action when the measurement is greater than the setpoint, except it will send a decrease pulse on the other bit of the bit pair selected.

Summary

Pulse Length = Time duration of the pulse length in seconds when waveform = 0, Range = 0-255 seconds.

Settle Time = Time between control action activated after tap change. This time equal to settle time minus pulse length.

Output Bit Pair = Selects which pair of digital output bits to be used for this loop. If more than one input loop per this controller, outbit of 1 not valid due to use of multiplexer.
D.O. = 7 6 5 4 3 2 1 0
Example: Outbit of 1 Uses Bits 0,1
Outbit of 2 Uses Bits 2,3
Outbit of 3 Uses Bits 4,5
More than one input loop mux. Uses Bits 0,1 therefore Outbit of 1 not valid.

Waveform Factor = Frequency of Pulsed Output as Explained Below.

Pulsed and Timed Duration Output Description

A number of pulses are calculated when measurement is out of range. This number is equivalent to pulse length/50 ms. This output can be a negative or positive number of pulses. Therefore, each loop required two bits of digital output. The even bits (D0,D2,D4) are used for a positive movement and the odd bits (D1,D3,D5) are used for a negative movement.

Waveform Factor - This number determines the time between each pulse. This will allow the output pulse of xx seconds to be a series of pulses of specified number of 50 ms. units.

EXAMPLE: 50 MILISECOND TIME PERIODS pulse length = .3 seconds

```
              50   100  150  200  250  300  350  400  450
OUTPUT=6     ─┼────┼────┼────┼────┼────┼────┼────┼────┼─

WAVEFORM=0    ┌─────────────────────────────┐
PULSES=6    ──┘                             └────────────

WAVEFORM=1    ┌────┐    ┌────┐    ┌────┐
PULSES=3    ──┘    └────┘    └────┘    └─────────────────

WAVEFORM=2    ┌────┐              ┌────┐
PULSES=2    ──┘    └──────────────┘    └────────────────
```

Communication: Condenser to Controller Initialization

The controller cannot initiate communication. The condenser can initiate communication between any controller and the condenser. The condenser begins a communication by calling up the communication subroutine within the condenser. The condenser, when it wishes to initiate communications with a specific controller, places the ID of the controller on the input communication bus. The input communication bus is an eight-wire bus corresponding to one byte of information. The ID for the specific controller consists of a four bit identification which identifies the attention line and therefore the row of controllers to be activated; and a four bit identification corresponding to the controller ID within a given row. With this identification method, the condenser can communicate with any one of 256 controllers. The rows can consist of 16 rows numbered 0 through 15 and 16 controllers within a row numbered 0 through 15. Thus, 16×16, or 256 controllers, can be directly addressed. In actual practice, groups of controllers and the condenser unit are housed in a standard instrumentation rack. Up to nine controllers can be placed in the racks containing additional controllers. This limits the number of controllers which can be directly accessed by the condenser to a total of 144. That is, 16 rows of nine controllers each, which gives a total of 144.

As was previously mentioned, to begin communication the condenser places the ID of the controller on the input communication bus. The condenser then activates the attention line for the proper row of controllers in which the controller we wish to communicate with is located. Simultaneously, the condenser starts an internal timer for communication reply. This is a "watchdog timer". If a reply communication is not received within the timespan of the timer, the condenser will stop the communication routine. When the attention line is activated, all controllers in the row, to which that attention line is hard wired, go into fast interrupt and stop controlling and start a communication routine. The controllers read the ID on the input communication bus and compare that ID with the ID that is hardwired into the backplane of that controller location. If the ID does not match, the controller disconnects from the communication bus and returns to normal operation. If the ID does match, the controller places the ID onto the output communication bus. This also is an eight bit bus. The condenser reads the output communication bus. If there is no data on the bus, the condenser looks at the timer to see if it has timed out. If the timer has not timed out, the condenser again reads the output communication bus. If the timer has timed out, the condenser discontinues the attempt to communicate with that particular controller and sets an alarm. If there is data on the output communication bus, the condenser compares that data with the ID which was originally sent on the input communication bus. If those two values do not match, the condenser discontinues the communication routine and sets an alarm. If the ID does match, the condenser then sends a one's complement of the original ID back to the controller on the input communication bus and resets the watchdog timer. The one's complement of the ID consists of reversing the data bits such that any bit which was high now becomes low and any bit which was low now becomes high. The controller reads the input communication bus, calculates the one's complement of the initial ID and compares this value with the value currently on the input communication bus. If this ID does not match, the controller discontinues communication and sends no reply. This causes the condenser to discontinue communications and set an alarm. If the one's complement does match, the controller then sends the one's complement of the ID back to the condenser on the output communication bus. The condenser reads the output communication bus and compares it with the data which was sent originally. Again, if there is no information on the output communication bus, the condenser looks to see if the timer has timed out. If the timer has not timed out, the condenser rereads the output communication bus. If the timer has timed out, the condenser discontinues the communication routine and sets an alarm. If there is information on the output communication bus, the condenser compares the data on the output communication bus with the one's complement of the original ID sent. If the data does not match, the condenser discontinues communications and sets an alarm. If the data does match, then the communication has been initialized and the communication subroutine is completed and communication can now start between the condenser and the controller. This full echo verify means of communication not only connects the proper controller to the condenser directly for communication but also checks all 16 communication lines including the input communication bus and the output communication bus. Any defect in any of the communication lines will cause communications to be broken and alarm set so the operator can correct the problem.

Condenser to Controller Communications

In order to understand the communications between the condenser and the controller, it must first be understood that within each controller there can be more than one loop. A loop is a functional response required by the controller in order to perform either the measurement or the measurement and control that that particular controller is required to perform. Each loop is designated by a unique code. Within a condenser resides a table which cross-references each particular loop to the particular controller wherein the loop resides. The loop identification also resides in the erasable programmable read-only memory (EPROM) within the loop record of the controller. Loop identification, when observed visually on the CRT of the condenser or the process operator's console, is typically a two digit numeric number, a single digit alpha character and a two digit numeric number. As for example, a temperature loop could be identified as 32T14. Inside the controller ad the condenser the loop identification is identified by two eight bit bytes of information. In digital format, loop identifications can range from five digital numbers 00000 through 59999. The first digit of this digital number, which can range from 0 to 5, is for area identification; for instance, batch house, melter, forehearth, bushings, forming, shipping, etc. The second digit identifies the furnace number, channel number or some other identifier. The third digit identifies the loop function characteristic. Typically, these include T for temperature loops given a value of 0, A for analyzer loops such as oxygen probe analyzers and given a value of 1, B for bushing temperature loops given a digital value of 2, C for computed loops such as ratio average and given a digital value of 3, D for data logging loops and given a digital value of 4, E for electrode monitoring loops given a value of 5, F for flow loops given a value of 6, L for level loops given a value of 7, P for pressure loops given a value of 8 and S for speed loops given a value of 9. The fourth and fifth digit is a sequential number within an area. As was previously mentioned, loop identifications can range in decimal numbers from 00000 to 59999. This gives a range for loop identifications in hexadecimal notation from 0000 to EA5F The loop example above of 32T14 would mean that this was from area 3 which could be a melter; the furnace number was 2; it was a temperature loop and it was the 14th electrode within the melter. Converted to a decimal number this identification would read 32014. In hexadecimal numbers, the identification of this loop would be 7D0E. In binary numbers, the first byte would be 01111101, and the second byte would be 00001110. This loop identification is important when considering the communications between the condenser and the controller.

There are within the condenser communication subroutine seven functions for communication that the condenser can perform. These functions are specific types of request for information from the controller to the condenser or for information from the condenser to the controller. Each one of the types of communication has a function code associated with it. The first function code in the condenser requests the ID of the loops in a controller. The second function code in the condenser requests the entire loop named ID. The third function code in the condenser requests the variable array part of a standard process control loop named ID. The fourth function code indicates that the condenser commands the deletion of a loop named ID. The fifth function code indicates that the condenser sends the primary and variable data portions to load an entire new loop. The sixth function code in the condenser requests a specified portion of an electrode monitoring loop named ID. The seventh function code in the condenser will send modification data for a specified portion of an existing electrode monitoring loop named ID. Each of these function codes will be explained in detail below. In all communications, a given protocol is established between the condenser and the controller. The condenser in all cases first sends a record with the byte count of the number of bytes which follow, then a byte which indicates the function code, then a number of bytes of information and then a check sum. The check sum is the one's complement of the summation of the number of bytes sent. The controller, when replying, will always send the first byte of information being the number of bytes which follows, then a number of bytes of data and a check sum which is the one's complement of the number of bytes sent. This can best be understood by analyzing the seven types of communication initiated by the condenser in detail.

The first function code, or function code 1, is where the condenser requests the IDs of the loops in a controller. As was mentioned previously, a given controller can have more than one loop residing within the controller. The condenser sends three bytes of information. The first byte is the number of bytes which follow or a byte count of 1; the second byte is the function code of the communications which is 1 and the third byte is the check sum of the bytes which is the one's complement of the byte count and the function code or the one's compliment of 2, which in hexadecimal would be the number FD. The controller, in response, sends a record with a byte count of 2N followed by N number of loop IDs and an appropriate check sum. Remembering, as previously discussed, that a loop ID consists of two 8 bit bytes of information, you can see why the byte count would be 2N. For instance, if the controller had only one loop residing within the controller, the byte count would be 2 followed by two 8 bit bytes identifying the loop. The check sum then would be the one's complement of the byte count and the two data bytes or one's complement of the number 3, which, in hexadecimal, would be FC. It should be noted that, if the controller does not have any loops at all, the N in the byte count will be 0 and the response naturally will have a byte count of 0 and no data bytes, that is, the response will be merely the acknowledgement record.

The second communication function, which has a function code of 2, is where the condenser requests the entire loop named ID. For electrode monitoring loops, this request is for the first part of the loop since electrode monitoring takes more than one loop to perform the function. In this communication protocol, the condenser sends a record with a byte count of 3, a function code of 2, a 2 byte ID value and an appropriate check sum. The 2 byte ID value is the ID of the loop for which the condenser is requesting the information. The check sum in this case will be the one's complement of the number 4, or, in hexadecimal, the number FB. If the controller has the specified loop, it sends a byte indicating the number of bytes to follow. It then sends a record containing a primary and variable loop data portions of the loop in one byte increments for each data position. It then sends a check sum which is the one's complement of the summation of the previously sent number of bytes. If the controller is sending information from an electrode monitoring loop, the controller sends the first part of the loop wherein the length is equal to the sum of the primary and variable parts of a standard process control loop, currently 140 bytes. If the controller has no loops at all, it sends a command rejection record containing a byte count of 0. If the controller has some loops, but not the specified loop, it sends a command rejection record containing a code byte of 1.

The third type of communication having a function code of 3 is where the condenser requests the variable array part of a standard process control loop named ID. As can be understood, this command is not used with electrode monitoring loops. If the condenser has no modification data for this loop, it sends a record with a byte count of 3, a function code of 3, a 2 byte ID value and a check sum which is the one's complement of the number 4 or, in hexadecimal, FB. The controller replies with a first byte being the byte count followed by the number of bytes containing a variable array part of the loop and an appropriate check sum. If the condenser has some modification data for this loop, it sends a record with a byte count of at least 6, a function code of 3, a 2 byte ID value, one or more modification data blocks and an appropriate check sum. A modification data block has a 1 byte displacement value giving the location within the specified loop, a 1 byte length giving the number of bytes to replace, plus the appropriate number of bytes containing the new data. The controller, in response, sends a byte count consisting of the number of bytes of the variable array currently in the loop as an acknowledgement, then follows the variable array data currently in the loop and an appropriate check sum. If the controller has no loops at all, it sends a command rejection record containing a code byte of 0. If the controller has some loops, but not the specified loop, it sends a command rejection record containing a code byte of 1.

The fourth type of communication having a function code of 4 is where the condenser commands a deletion of a loop named ID. In this case, the condenser sends a record with a byte count of 3, a function code of 4, a 2 byte ID value and an appropriate check sum. If the controller has the specified loop, it sends an acknowledgement record with a byte count of 0. If the controller has no loops at all, it sends a command rejection record containing a code byte of 0. If the controller has some loops but not the specified loop, it sends a command rejection record containing a code byte of 1.

The fifth type of communication with a function code of 5 is where the condenser sends the primary and variable data portions to load an entire new loop. This command is not to be used with electrode monitoring loops. The condenser sends a record with a byte count of N+1, a function code of 5, N (currently 140) bytes of data containing primary and variable data portions of the new loop and an appropriate check sum. The 2 byte loop ID value does not explicitly appear in the protocol for this command since it is present in the loop data being transferred. If the controller has other loops but it can accept the new loop, it sends an acknowledgement record byte count of 0. If the controller has no loops at all, it accepts the new loop but sends a command rejection record containing a code byte of 0. If the controller already has the specified loop or if it does not have sufficient room for another loop, it ignores the new loop and sends a command rejection record containing a code byte of 1.

The sixth communication option, which has a function code of 6, is where the condenser requests a specified portion of the electrode monitoring loop named ID. The condenser sends a record with a byte count of 6, a function code of 6, a 2 byte ID value, a 2 byte displacement for the start of the data in the loop, a 1 byte length for the data to send and an appropriate check sum. If the controller has the specified loop, it sends a byte count of the number of bytes to follow. It then sends a record containing the requested bytes from the loop and an appropriate check sum. If the controller has no loops at all, it sends a command rejection record containing a code byte of 0. If the controller has some loops but not the specified loop, it sends a command rejection record containing a code byte of 1.

The seventh type of communication, which has a function code of 7, is where the condenser sends modification data for a specified portion of an existing electrode monitoring loop named ID. The condenser sends a record with a byte count of 5+N, a function code of 7, a 2 byte ID value, a 2 byte displacement for the start of the data in the loop, N data bytes for modifying the loop and an appropriate check sum. If the controller has the specified loop, it sends an acknowledgement record byte count of 0. If the controller has no loops at all, it sends a command rejection record containing a code byte of 0. If the controller has some loops but not the specified loop, it sends a command rejection record containing a code byte of 1.

Communication: Subhost to Condenser

The subhost is the master for all communications. The slave condensers respond to data transfer commands from the subhost. If a new command from the subhost is sent to a condenser while the condenser is sending its response to a previous command, the execution of the older command is aborted and the processing of the new command is begun. Communicating is by means of a standard synchronous protocol, SDLC, over a daisy chained serial communication line. Data is transferred in packets which contain 1 to 255 user bytes. A given message, or logical record, may have to be sent in several consecutive packets. Because the condenser has a limited memory, commands from the subhost may not exceed 5 packets (1275 bytes). Responses from the condenser to the subhost may be considerably longer. The SDLC protocol specifies the method to direct a message packet to the proper device, to detect the end of a packet, and to insure that a packet has been successfully transferred—retrying if necessary. Such items defined by the protocol, which is known in the art, will not be discussed here. This discussion will concern only the user data embedded in the protocol. Error detection bytes will not be placed in the user data stream since they are already included in the SDLC protocol.

The first data byte in every packet will be a control byte used to describe the type of data in the remaining bytes in the packet. A control byte having a value of zero must never be sent by either the subhost or a condenser. If the most significant bit (value of 128 or $80, where '$' signifies a hexadecimal number) of the control byte is set, the message will be continued in the next packet. The next-to-most significant bit (value of 64 or $40) of the control byte is set by the subhost to indicate to the condenser that a packet is the start of a new command. In all commands from the subhost to a condenser, the least significant 6 bits (values 1 to 63 or $3F) in the control byte will contain a function code indicating the type of data transfer being requested. Valid commands are acknowledged by the condenser sending a reply having the same function code as the command, followed by any requested data. If a condenser cannot perform the command sent from the subhost, the condenser will respond with a message having a command reject control byte. A command reject control byte is defined as one having the next-to-most significant bit (value of $40) set. If the condenser has some process control loops, but cannot comply with the command from the subhost because, for example, it does not have the specified loop, the least significant 6 bits of the command reject byte will contain the failing function code. If the condenser cannot comply with the command from the subhost because it does not have any process control loops, the least significant 6 bits of the command reject byte will have a value of zero. When a condenser sends a command reject with a zero function code (control byte=$40), it is requesting a reloading of its process control loops. Such a request will normally occur when a condenser replacement has been installed, and can be the response to any command at any time. When the subhost receives a reload request, it should stop its normal command sequence for updating the process control loop tables, and start sending a series of 'load new loop' commands (function code 5, see below), one loop at a time, until all loops have been sent to the condenser.

For purposes of this discussion, the phrase 'standard process control loop' will refer to any loop that is neither the condenser master loop nor an electrode monitoring loop—even if the loop has a monitor-only control algorithm.

The function codes used by the subhost/condenser communication are:

1. Subhost requests the ID's of the loops in a condenser.

This function would not be expected to be needed during normal operations in the system. It can be used for diagnostic purposes, or as part of a procedure to install a new subhost in a plant which had been using only condensers.

The subhost sends a record consisting only of a control byte having a function code of 1 (control byte=$41).

If the condenser has a valid table of loops, it will respond with a record having a control byte with a function code of 1, followed by the appropriate number of loop ID's. The loop ID's will include the condenser master loop, any standard process control loops, plus any electrode monitoring loops. If the condenser has no loops, it will send a record consisting only of a command reject control byte with a function code of 0 (control byte=$40). The other type of command reject, one having a function code of 1 (control byte=$41), is not possible.

2. Subhost requests the entire contents (up to the condenser local portion, currently 140 bytes for a standard process control loop, 1048 bytes for an electrode monitoring loop, or 168 bytes for the condenser master loop) of a set of loops.

Since changes to process loops at the condenser level are automatically reported to the subhost (see function code 7, below), this function would normally only be used if a new loop had been entered through the condenser keyboard. It can also be used for diagnostic purposes or when loading a new subhost with existing loops in a plant which had been using only condensers.

The subhost sends a single-packet record having a control byte with a function code of 2 (control byte=$42), followed by 1-127 double-byte loop ID values.

If the condenser has no loops, it will send a record consisting only of a command reject control byte with a function code of 0 (control byte=$40). If the condenser has some loops, it will process the request in the order given in the command. The response for each loop will begin on a message packet boundary and will take as many packets as needed for the size of the loop. If any loop needs more than one packet (currently only electrode monitoring loops), the break between packets will fall between process variables, not within a process variable. If the condenser has the next loop to be processed, the response for that loop will be a packet with a normal control byte having a function code of 2 (control byte=2 if last loop in list, control byte=$82 if more ID's are to be processed), followed by the contents of the requested loop. If a requested loop is not in the condenser, the response for that loop will be a packet with a command reject control byte containing a function code of 2 (control byte=$42 if last loop in list, control byte=$C2 if more ID's are to be processed), followed by the ID of the missing loop.

3. Subhost requests the variable array part (currently 32 bytes numbered 108 through 139 for a standard process control loop, 516 bytes numbered 532 through 1047 for an electrode monitoring loop, or 94 bytes numbered 74 through 167 for the condenser master loop) of a set of loops.

The subhost would normally use this function to gather changing process information on a few loops at a time as part of a background scan in keeping its process control tables up to date. It would also use this function to refresh the data being displayed on a Process Operator's Console.

The subhost sends a single-packet record having a control byte with a function code of 3 (control byte=$43), followed by 1-127 double-byte loop ID values.

If the condenser has no loops, it will send a record consisting only of a command reject control byte with a function code of 0 (control byte=$40). If the condenser has some loops, it will process the request in the order given in the command. The response for each loop will be in a separate message packet. If the condenser has the next loop to be processed, the response for that loop will be a packet with a normal control byte having a function code of 3 (control byte=3 if last loop in list, control byte=$83 if more ID's are to be processed), followed by the double-byte loop ID and the data in the variable array portion of the requested loop. If a requested loop is not in the condenser, the response for that loop will be a packet with a command reject control byte containing a function code of 3 (control byte=$43 if last loop in list, control byte=$C3 if more ID's are to be processed), followed by the ID of the missing loop.

4. Subhost commands the deletion of a set of loops.

This function would normally be used to carry out a request initiated through a Process Operator's Console.

The subhost sends a single-packet record having a control byte with a function code of 4 (control byte=$44), followed by 1-127 double-byte loop ID values. The ID of any standard process control loop or f any electrode monitoring loop can be included in this list.

If the condenser has no loops, it will ignore the command and will send a record consisting only of a command reject control byte with a function code of 0 (control byte=$40). If the condenser has some loops, it will respond with one or two message packets. The first message packet, if used, will have a normal control byte with a function code of 4 (control byte=4 if the second packet not needed, or $84 if both packets are to be sent), followed by a list of loops that have been marked for deletion. If there are no entries in this list, the packet is not sent. The subhost will be informed when the loops are actually deleted from the controllers (see function code 7, below). The second message packet, if used, will have a command reject control byte with a function code of 4 (control byte=$44), followed by a list of loops that were not found. If there are no entries in this list, the packet is not sent.

5. Subhost sends the entire contents (up to the condenser local portion, currently 140 bytes for a standard process control loop, 1048 bytes for an electrode monitoring loop, or 168 bytes for the condenser master loop) to load a new loop.

This function will be used to send a new loop entered through a Process Operator's Console, or as one of a series of commands used to reload the loops in a condenser.

The subhost sends a record having a control byte with a function code of 5 (control byte=$45 for the last or only packet, or $C5 if more packets are to be sent), followed by the data for the new loop.

If the condenser has no loops at all, it will accept the new loop, but will respond with a record consisting only of a command reject control byte with a function code of 0 (control byte=$40). This response is necessary to insure that the subhost is informed of the need to reload the condenser. The command to load this loop probably is the first step in reloading, but could also merely be sending a truly 'new' loop to the condenser. If the condenser has some loops, and can accept the new loop, it sends an acknowledgment record consisting only of a normal control byte with the same function code (control byte=5). The subhost will be informed when the loop has been loaded into the proper controller (see function code 7, below). If the condenser already has the specified loop, or it does not have sufficient room for another loop, it sends a record consisting only of a command reject control byte with a function code of 5 (control byte=$45).

6. Subhost sends loop modification data.

This function will be used to send commands entered through a Process Operator's Console to modify existing standard process control loops, electrode monitoring loops, or the condenser master loop.

If the subhost has some modification data for one or more existing loops in a condenser, it sends a record having a control byte with a function code of 6 (control byte=$46 for the last or only packet, or $C6 if more packets are to be sent), followed by one or more new data blocks. Each new data block has a 2-byte ID value, a 1- or 2-byte displacement value giving the location within the specified loop, a 1-byte length giving the number of bytes to replace, plus the appropriate number of bytes containing the new data. If the displacement to the start of the new data in the loop is less than 128 bytes, then a 1-byte, unmodified displacement will be used. If the displacement is more than 127 bytes, then a 2-byte displacement will be sent. The first of these two bytes will contain the one's compliment of the more significant half of the displacement. The second byte will contain the less significant half of the displacement (uncomplimented).

If the condenser has no loops, it will ignore the command and will send a record consisting only of a command reject control byte with a function code of 0 (control byte=$40). If the condenser has some loops, it will respond with one or two message packets. The first message packet, if used, will have a normal control byte with a function code of 6 (control byte=6 if the second packet not needed, or $86 if both packets are to be sent), followed by a list of loops that have been changed in the condenser. If there are no entries in this list, the packet is not sent. The subhost will be informed when the loops are actually changed in the controllers (see function code 7, below). The second message packet, if used, will have a command reject control byte with a function code of 6 (control byte=$46), followed by a list of loops that were not found. If there are no entries in this list, the packet is not sent.

7. Subhost requests reporting of loop changes which need to be logged.

This function will be used by the subhost to find out what loop information (if any) has been changed through the condenser keyboard, what process alarms have been detected by the condenser or the controllers connected to it, and what loop changes previously commanded by the subhost have actually been completed at the controller level. Note that values which change by normal controller operation (e.g., input reading, calculated output value, setpoint or bias if cascaded from another loop) are not reported by this function (see function code 3, above).

The subhost sends a record consisting only of a control byte with a function code of 7 (control byte=$47).

If the condenser has no loops, it will send a record consisting only of a command reject control byte with a function code of 0 (control byte=$40). The other type of command reject, one having a function code of 7 (control byte=$47), is not possible. If the condenser has no changes to report, it will send a record consisting only of a normal control byte having the same function code (control byte=7). If the condenser has some changes to report, it will send a record having a control byte with a function code of 7 (control byte=7 for the last or only packet, or $87 if more packets are to be sent), followed by one or more new data blocks. Several new data blocks may be placed in each packet, but no new data block will cross a packet boundary. Each new data block has a 2-byte ID value, a 1- or 2-byte displacement value giving the location within the specified loop, a 1-byte length giving the number of data bytes to follow, plus the appropriate number of bytes containing the new value of the changed data. If the displacement to the start of the new data in the loop is less than 128 bytes, then a 1-byte, unmodified displacement will be used. If the displacement is more than 127 bytes, then a 2-byte displacement will be sent. The first of these two bytes will contain the one's compliment of the more significant half of the displacement. The second byte will contain the less significant half of the displacement (uncomplimented).

The subhost will have to determine the type of change that has occurred by examining the location of the data in the loop, by comparing the new value with the old value, and by remembering what acknowledgments are pending for changes previously sent to a condenser from the subhost. Changes that have occurred within the primary array part of a standard process control loop will always be sent in multiples of 4 bytes—even if only 1 byte has changed. Changes that have occurred within the variable array part of a standard process control loop will also be sent in multiples of 4 bytes, but need no special concern since all items in the variable array are 4 bytes in length. Changes that occur in the MSFLAG byte in a standard process control loop, or that occur anywhere within the condenser master loop, will be reported with no extraneous bytes.

The following are some specific examples of the conditions that will be reported to the subhost by this function:

A. A change has been made to the 'output deadband option', bits 2-3 in byte 17 of a standard process control loop. After the change has been successfully sent to the appropriate controller, the condenser will respond to the subhost command having a function code 7 by sending a new data block with bytes 16 (INBAD), 17 (OUALA), 18 (OUALB), and 19 (BIOPP). The subhost will have to determine that INBAD should be ignored (contains only information used internally by a controller), that OUALA has changed, and that OUALB and BIOPP have not changed. If the subhost had previously sent a command to make this change, the report is acknowledging that the change has been made. If the subhost does not have such a change pending, the response must be reporting that a change has been made through the condenser keyboard. The subhost should print the name of the parameter that was changed, the ID of the loop in which the change occurred, the old and new data values, and the origin of the change. Note that it could be possible for several changes to be reported in the same new data block.

B. A status change has been detected in a loop by a controller (auto/manual, alarm/no alarm, control stopped/control resumed) or by the condenser (communication alarm/no alarm, needed loop not found error, loop setup error). All of these conditions will set or clear bits in the 4 bytes of MSGWRD in a loop. The condenser will respond to a subhost command with function code 7 by sending a new data block containing MSGWRD. Most of these status changes should be logged on the printer, some may result in the sounding of the process alarm siren (depending on the alarm action options specified in the primary array part of the loop).

C. A loop has been added to or deleted from a controller. The condenser will respond to a subhost command with function code 7 by sending a new data block containing the byte MSFLAG with bit 1 (loop deleted) set, bit 3 ('dumb' controller reloaded) set, or bit 4 (new loop loaded) set. For the cases of a loop deleted or a new loop added, the subhost will have to determine if the action was taken in response to a previous subhost command, or whether it was due to a condenser keyboard entry. The subhost should print the ID of the loop; whether it was loaded, reloaded, or deleted; and the origin of the command. If the subhost determines that a new loop was added through the condenser keyboard, it should request the data for the new loop (see function code 2, above).

32. 33. etc. Subhost sends a message through a condenser directly to a controller.

These functions provide a means for the subhost to communicate directly with a controller for data analysis or for diagnostic purposes.

The subhost sends a single-packet record having a control byte with a function code greater than 31 (control byte=$60 through $7F for function codes 32 through 63), a byte containing the rack number, a byte containing the controller number, and 1-252 message bytes.

If the condenser has no loops, it will ignore the command and will send a record consisting only of a command reject control byte with a function code of 0 (control byte=$40). If the condenser has some loops, it will attempt to send to the specified controller: an appropriate byte count, the same 32 through 63 function code, the 1-252 message bytes, and a checksum. If the message cannot be sent due to a controller no-response condition or a condenser/controller data transfer error, the condenser will send a record to the subhost consisting only of a command reject control byte with the same function code (control byte=$60 through $7F for function codes 32 through 63). If a response is received from the specified controller, the condenser will send the response (stripped of the byte count and checksum, but otherwise unexamined) back to the subhost in a record having a normal control byte with the same function code (control byte=$20 through $3F for function codes 32 through 63).

System

As can be seen from the above detailed description of the various components of the system, several unique features are disclosed for this process control system. Each controller in this system is identical. The memory in each controller contains all of the communication software, input subroutines and algorithms necessary to control any type of industrial process. Each controller can accept input signals as either analog signals or digital signals. Each controller can output control signals as either analog signals or digital signals. All interconnections to the controller are on a single printed circuit board connector on the back of the controller. All ground pins on this connector are longer than all other pins allowing the controller to be plugged into a mating backplane connector without the need of removing power from the system. The backplane connector selectively grounds identification lines, thus, giving each position in a row of controllers a unique identification. Each row of backplane connectors is connected to a given address line from the condenser. This gives every position in an instrument rack housing the controllers a unique identification. Any controller may be plugged into a backplane connector and immediately assume the identification of that backplane position. Each controller can control more than one loop. Loop records are stored in the controller to inform the controller of the type of input it is to receive, how to scale or manipulate the input for internal calculations, the algorithms necessary to perform to produce a control signal and where and in what format to output the control signal. The condenser has stored in its bubble memory a table of what loop records should be in what controller identification location. All information for that loop record is also stored in the condenser. This information is also stored in the subhost. When a controller is initially plugged in, it is dumb except for its identification which is hardwired into the backplane. The condenser continuously polls the controllers asking for information. When the new controller is first polled, it informs the condenser that it is dumb. Subsequent polling cycles allows the condenser to load all information for the loop records into the controller. The controller then begins controlling. After the initial load of the loop records, the controller will continue to control even if the condenser fails to operate. Similarly, the subhost continuously polls the condensers connected to it. If a condenser fails and is replaced, the subhost will reload all loop records, all tables and all control constants for every controller associated with the failed condenser into the condenser. Should an individual controller fail, alarm signals are activated in the condenser during the normal polling sequence because of a lack of a response from the controller. Indicator lamps, or LEDs, on the front of the controller also signal that the controller has failed. The controller also notifies the field devices or control devices by means of the FAIL line that failure has occurred. The field devices can be equipped with track and hold circuitry to hold the device at its last control setting so that the process is not interrupted while the defective controller is replaced. Should a subhost fail, all condensers associated with that subhost will continue to operate normally. When the subhost is repaired or replaced, the normal polling sequence or communication sequence between the subhost and condenser will allow each condenser to load all tables, loop records and other stored data into the subhost. Communication between the various levels in the system always checks for hardware integrity by its echo system of communication. The one's compliment for verify checks all communication hardware lines for integrity. By sending the number which is the number of bytes to follow and then a checksum which is the one's compliment of the number of bytes sent, the system ensures integrity of data transmission. By means of hardwired backplane identification of controllers, full echo with verify communication, identical controllers with both analog and digital capability, stand-alone capability for all lower level subsystems, automatic upload/download of information and complete manual control at each level, this process control system overcomes all of the problems inherent in an integrated process control system.

It will be appreciated by those skilled in the art that various modifications and improvements may be made to the detailed embodiment set forth herein without departing from the spirit and intent of the invention as defined in the appended claims.

We claim:
1. A process control system comprising:
a plurality of identical controllers, each controller controlling at least one process parameter, each controller including an input means for receiving an input signal corresponding to the value of a measured parameter;
means within said controller for calculating an output control signal based upon said input signal;
output means within said controller for sending said output control signal to a device being controlled;
a plurality of identical condenser means selectively connectable to a group of said plurality of controllers each of said condensers able to initiate communication with each of said controllers connected thereto for receiving process data and for varying the operation of said calculating means within said controller wherein each of said controllers connected to said condenser means is operable in said process without aids condenser means;
a plurality of identical subhost means selectively connectable to a group of said plurality of condenser means each of said subhost able to initiate communication with each of said condenser connected thereto for receiving process data and for varying the operation of said calculating means of said controllers connected to said condenser means wherein each of said condenser means connected to said subhost is operable in said process control without said subhost means; and
a host computer selectively connected to all subhost means for receiving process data wherein each of said subhost means is operable in said process control without said host computer.

2. The process control system of claim 1 wherein each of said controllers includes a manual control means for controlling the output control signal of said controller manually and for inhibiting the output control signal generated by said calculating means.

3. The process control system of claim 1 wherein said input means can accept either an analog signal or a digital signal.

4. The process control system of claim 1 wherein said output means can send either an analog signal or a digital signal.

5. The process control system of claim 1 wherein said controllers include two visual displays of process information.

6. The process control system of claim 1 wherein said controllers include visual indications of the status of said controller.

7. The process control system of claim 1 wherein said controllers may be removed and replaced without removing power from the system.

8. The process control system of claim 1 wherein said condenser includes means for selectively establishing communications between a controller and said condenser.

9. The process control system of claim 8 wherein said communication means includes a full echo, verify subroutine to ensure proper identification of said controller and to check integrity of hardware.

10. The process control system of claim 8 wherein said communication means includes an input communication bus and an output communication bus, each of which is an eight bit parallel communication bus.

11. The process control system of claim 1 wherein said condenser includes a video display screen to display process data.

12. The process control system of claim 1 wherein said condenser includes a keyboard to input process data and to activate a display.

13. The process control system of claim 1 wherein said condenser includes a bubble memory.

14. The process control system of claim 1 wherein said subhost includes a keyboard, two video displays, a printer and mass memory storage devices.

15. The process control system of claim 1 wherein said subhost includes means for selectively establishing communication between a condenser and said subhost.

16. The process control system of claim 15 wherein said communication means includes daisy-chained synchronous data link communication with said condensers.

17. A distributed process control system comprising:
a plurality of interchangeable identical controllers, each controller including an input means for receiving an input signal corresponding to the value of a measured parameter;
a plurality of control algorithms contained within said controller to perform calculations upon said input signal;
means to select a particular algorithm to perform calculations upon said input signal to produce an output control signal;
means to transmit said output control signal to field devices to control a process;
means integral to said controller to display a representation of said input signal and said output control signal;
means integral to said controller to manually set and adjust said controller output control signal;
a plurality of identical condenser means, each of said condenser means selectively connectable to each of a group of the plurality of said controllers by a control bus, an input communication bus and an output communication bus;
means integral with said condenser for communicating with each of said controllers connected to said condenser over serial input and output communication buses for selectively receiving or sending process data and for varying the operation of said selected algorithm within said controller;
a subhost means selectively connectable to each of a group of the plurality of said condenser means by a serial communication bus; and
means integral with serial subhost for communicating with each of serial condensers connected to serial subhost for selectively receiving or sending process data and for varying the operation of said selected algorithm within controllers connected to said condensers.

18. The distributed process control system of claim 17 wherein said controllers are operable in said process if said condenser fails.

19. The distributed process control system of claim 17 wherein said condenser and all controllers connected to said condenser are operable in said process if said subhost fails.

20. The distributed process control system of claim 17 wherein said input means includes means to accept either an analog signal or a digital signal.

21. The distributed process control system of claim 17 wherein said means to transmit includes a means to transmit either an analog signal or a digital signal.

22. The distributed process control system of claim 17 wherein said means to manually set and adjust said controller output control signal includes means to bypass the means to perform calculations.

23. The distributed process control system of claim 17 wherein said controller includes a means to display information.

24. The distributed process control system of claim 17 wherein said condenser includes a means to input information and a means to display information.

25. The distributed process control system of claim 17 wherein said subhost includes a means to input information and a means to display information.

26. The distributed process control system of claim 17 wherein said communicating means integral with said condenser includes a means to identify a particular controller and a means to verify the integrity of said input communication bus and said output communication bus.

27. The distributed process control system of claim 17 wherein said communicating means integral with said subhost means includes a means to selectively communicate with a specific condenser connected to said subhost.

28. A process control system comprising:
a plurality of controllers, divided into groups of controllers;
a plurality of condensers, divided into groups of condensers, each of said condensers connected to a group of controllers by means of a control bus, an input communication bus, an output communication bus and at least one attention line wherein each controller connected to said condenser is operable in said process without said condenser;
a plurality of subhosts, each of said subhosts connected to a group of condensers by means of a first daisy-chained serial communication line wherein each condenser and each controller connected to each condenser is operable in said process without said subhost;
a host computer connected to all subhosts by means of a second daisy-chained serial communication line, wherein each subhost, each condenser connected to each subhost and each controller connected to each condenser is operable in said process without said host computer;
each controller including:

a first input means for receiving an input signal corresponding to the value of a measured parameter;

a second input means for receiving parallel digital data from said condenser over said input communication bus;

a microprocessor means for controlling the operation of said controller;

a memory means for storing information for operating said microprocessor;

program means stored in said memory for operating said microprocessor including communication subroutines, input scaling subroutines, alarm subroutines and algorithms for calculating a first control signal; a manual control means for manually producing a second control signal and for inhibiting said first control signal;

a visual display means for selectively displaying information within said controller;

a first output means to transmit said control signal to a field device which is to be controlled;

a second output means for sending parallel digital data to said condenser over said output communication bus;

each condenser including:

a first input means for receiving a plurality of input signals from field devices;

a second input means for receiving parallel digital data from said controllers on said output communication bus;

a third input means for receiving serial data on said first daisy-chained serial communication line from said subhost;

a microprocessor means for controlling the operation of said condenser;

a memory means for storing information from said controllers and said subhost and for storing information for operating said microprocessor;

program means stored in said memory means for operating said microprocessor;

a keyboard means for entering information into said condenser;

a visual display means for selectively displaying information in said condenser;

a first output means to transmit information to field devices;

a second output means for sending parallel digital data to said controllers over said input communication bus;

a third output means for sending serial data over said first daisy-chained serial communication line to said subhost;

each of said subhost including:

a first input means for receiving serial data from said condensers over said daisy-chained serial communication line;

a second input means for receiving serial data from said host computer over said second daisy-chained serial communication line;

a microprocessor means for controlling the operation of said subhost;

a memory means for storing information from said condensers and from said host computer and for storing information for operating said microprocessor;

program means stored in said memory means for operating said microprocessor;

keyboard means for entering information into said subhost;

visual display means for selectively displaying information in said subhost;

a first output means for sending serial data over said first daisy-chained serial communication line to said condensers; and a second output means for sending serial data over said second daisy-chained serial communication line to said host computer.

* * * * *